(12) United States Patent
Blevio, Sr.

(10) Patent No.: US 7,472,862 B2
(45) Date of Patent: Jan. 6, 2009

(54) ROTATING BLADE AIRCRAFT CONTROL SYSTEM

(76) Inventor: Henry L. Blevio, Sr., 9 Oak Point Club, New Milford, CT (US) 06776

( * ) Notice: Subject to any disclaimer, the term of this patent is extended or adjusted under 35 U.S.C. 154(b) by 0 days.

(21) Appl. No.: 11/705,622

(22) Filed: Feb. 14, 2007

(65) Prior Publication Data

US 2007/0187548 A1    Aug. 16, 2007

Related U.S. Application Data

(62) Division of application No. 10/958,038, filed on Oct. 4, 2004, now Pat. No. 7,226,017.

(60) Provisional application No. 60/507,530, filed on Oct. 2, 2003.

(51) Int. Cl.
    *B64C 27/50*    (2006.01)

(52) U.S. Cl. .......................... 244/7 B; 244/7 A; 244/49

(58) Field of Classification Search ................. 244/3.27, 244/3.28, 3.29, 3.24, 49, 17.27, 7 B, 7 A, 244/17.25
See application file for complete search history.

(56) References Cited

U.S. PATENT DOCUMENTS 7,147,181 B2 *  12/2006  Selin et al. .................. 244/3.27

FOREIGN PATENT DOCUMENTS

FR            2309401        * 12/1976

* cited by examiner

*Primary Examiner*—Timothy D Collins
(74) *Attorney, Agent, or Firm*—K. Gibner Lehmann

(57) ABSTRACT

In a preferred embodiment, an apparatus, including: an aircraft having rotatable blades; and the rotatable blades are movable between horizontal and vertical positions.

10 Claims, 28 Drawing Sheets

ROTATING BLADE AIRCRAFT CONTROL SYSTEM

CROSS-REFERENCE TO RELATED APPLICATION

The present application is a divisional of U.S. application Ser. No. 10/958,038, filed Oct. 4, 2004, now U.S. Pat. No. 7,226,017 and titled AERODYNAMICALLY STABLE, HIGH-LIFT, VERTICAL TAKE OFF AIRCRAFT. Benefit is claimed of the filing date of U.S. Provisional Application Ser. No. 60/507,530, filed Oct. 2, 2003, and titled FIVE-PIECE FUSELAGE, INCLUDING ENGINES AND WINGS, FOR AN AERODYNAMICALLY STABLE, HIGH-LIFT, VERTICAL TAKEOFF AIRCRAFT.

BACKGROUND OF THE INVENTION

1. Field of the Invention

The present invention relates to vertical take-off aircraft generally and, more particularly, but not by way of limitation, to a novel rotating blade control system for such an aircraft.

2. Background Art

Vertical take-off aircraft are useful in various situations in which horizontal space is limited. Aircraft are well known means of air transport. Among conventional aircraft are: common airplanes with fixed wings, helicopters with rotating wings, common airplanes with tilting rotors (Osprey), gyrocopters with freely rotating wings creating lift by spinning because vehicle is pushed with regular horizontal motor with propeller, fighter jets with adjustable thrust downwards for takeoff and horizontal thrust to fly (Joint Air Strike Fighter), rockets, and disc-shaped aircraft with internal engine exhaust blowing over airfoil to create lift.

A disadvantage of many of these conventional aircraft is that they require a relatively long horizontal distance to take off. Others, such as rockets, are unsuitable for general use.

The Osprey suffers from the disadvantage that it has only a lift force or a push force by propellers and during transitional flight, this force is divided. Because of the tilting of the propellers, the vehicle bearing low pressure disc (created by the propellers) gets much smaller and is divided into a vertical part and a horizontal part. But the vertical part needs enough bearing capacity to lift. This is resolved by providing oversized propellers—more than necessary—and this requires more than necessary engine power that is not efficient. Huge propellers are not efficient and are disturbing for straight level flight. During the tilting process, the propellers cut through the downwards directed air stream, reduce efficiency, and make the aircraft very shaky and unsecured. The tilting rotating masses create a gyroeffect and make it very hard to stabilize the aircraft, one movement creating another effect and so on. Sometimes the aircraft is impossible to control and it falls down.

Some attempts to provide such an aircraft include the following:

U.S. Pat. No. 2,859,003, issued Nov. 4, 1958, to Servanty, and titled AERODYNE, describes a vertical take-off aircraft that has three equally spaced engines spaced apart from the base of a fuselage by vertical wings. Three vertical winglets are disposed near the top of the fuselage. The fuselage is generally bullet-shaped.

U.S. Pat. No. 3,045,951, issued Jul. 24, 1962, to Freeland, and titled AIRCRAFT, describes an aircraft in which the four engines thereof are disposed within a fuselage that slopes inwardly and downwardly from a dome-shaped upper portion, but the lower portion is flared outwardly at the bottom thereof.

U.S. Pat. No. 3,120,359, issued Feb. 4, 1964, to Sprecher, and titled AIRCRAFT WITH EQUI-SPACED POWER PLANT, describes an aircraft that has four equally spaced engines disposed at an upper end of a fuselage and joined thereto by wings and four interposed wings disposed at a lower end of the fuselage and bearing at their distal ends landing gears. The fuselage is generally bullet-shaped.

U.S. Pat. No. 3,252,673, issued May 24, 1966, to Reichert, and titled SUPERSONIC VTOL AIRCRAFT AND LAUNCH VEHICLE, describes an aircraft having two engines disposed on the outside of a cylindrical shroud disposed in approximately the middle of a bullet-shaped aircraft, the shroud being supported from the aircraft by struts. Three wings are disposed at a lower end of the fuselage.

U.S. Pat. No. 4,123,018, issued Oct. 31, 1978, to Tassin de Montaigu, and titled HELICOPTER WITH COAXIAL ROTORS, OF CONVERTIBLE TYPE IN PARTICULAR, describes a helicopter that is clearly non-symmetrical.

U.S. Pat. No. 4,433,819, issued Feb. 28, 1984, to Carrington, and titled AERODYNAMIC DEVICE, describes a rotatable disk affixed to a central, generally dome-shaped body, the disk including a plurality of selectively vectorable jets. A plurality of reaction jets are attached to the central body.

U.S. Pat. No. 5,178,344, issued Jan. 12, 1993, to Dlouhy, and titled VTOL AIRCRAFT, describes, insofar as pertinent, a disk-shaped aircraft having a plurality of rotating sets of rotor blades disposed at least partially beneath the disk. The rotor blades may be pivotable to provide for horizontal motion of the aircraft.

U.S. Pat. No. 5,595,358, issued Jan. 21, 1997, to Demidov et al., and titled MULTIPURPOSE AIRBORNE VEHICLE, describes an aircraft having a plurality of rotor units disposed below a ring-shaped fuselage.

U.S. Pat. No. 5,839,691, issued Nov. 24, 1998, to Lariviere, and titled VERTICAL TAKEOFF AND LANDING AIRCRAFT, describes such an aircraft that is clearly not symmetrical about its vertical axis.

U.S. Pat. No. 6,293,491, issued Sep. 25, 2001, to Wobben, and titled VERTICAL TAKE-OFF AND LANDING AIRCRAFT, describes another such aircraft that is clearly not symmetrical about its vertical axis.

Accordingly, it is a principal object of the present invention to provide a vertical takeoff aircraft that is aerodynamically stable.

It is a further object of the invention to provide such an aircraft that has high lift.

It is another object of the invention to provide such an aircraft that is highly symmetrical.

It is an additional object of the invention to provide novel landing gears, including ball wheels, for such an aircraft.

It is yet a further object of the invention to provide a novel method of adjusting pitches of rotating blades for such an aircraft.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing in a preferred embodiment, an apparatus, comprising: an aircraft having rotatable blades; and said rotatable blades are movable between horizontal and vertical positions.

BRIEF DESCRIPTION OF THE DRAWING

Understanding of the present invention and the various aspects thereof will be facilitated by reference to the accompanying drawing figures, provided for purposes of illustration only and not intended to define the scope of the invention, on which.

DETAILED DESCRIPTION OF THE PREFERRED EMBODIMENTS

Figure 1:
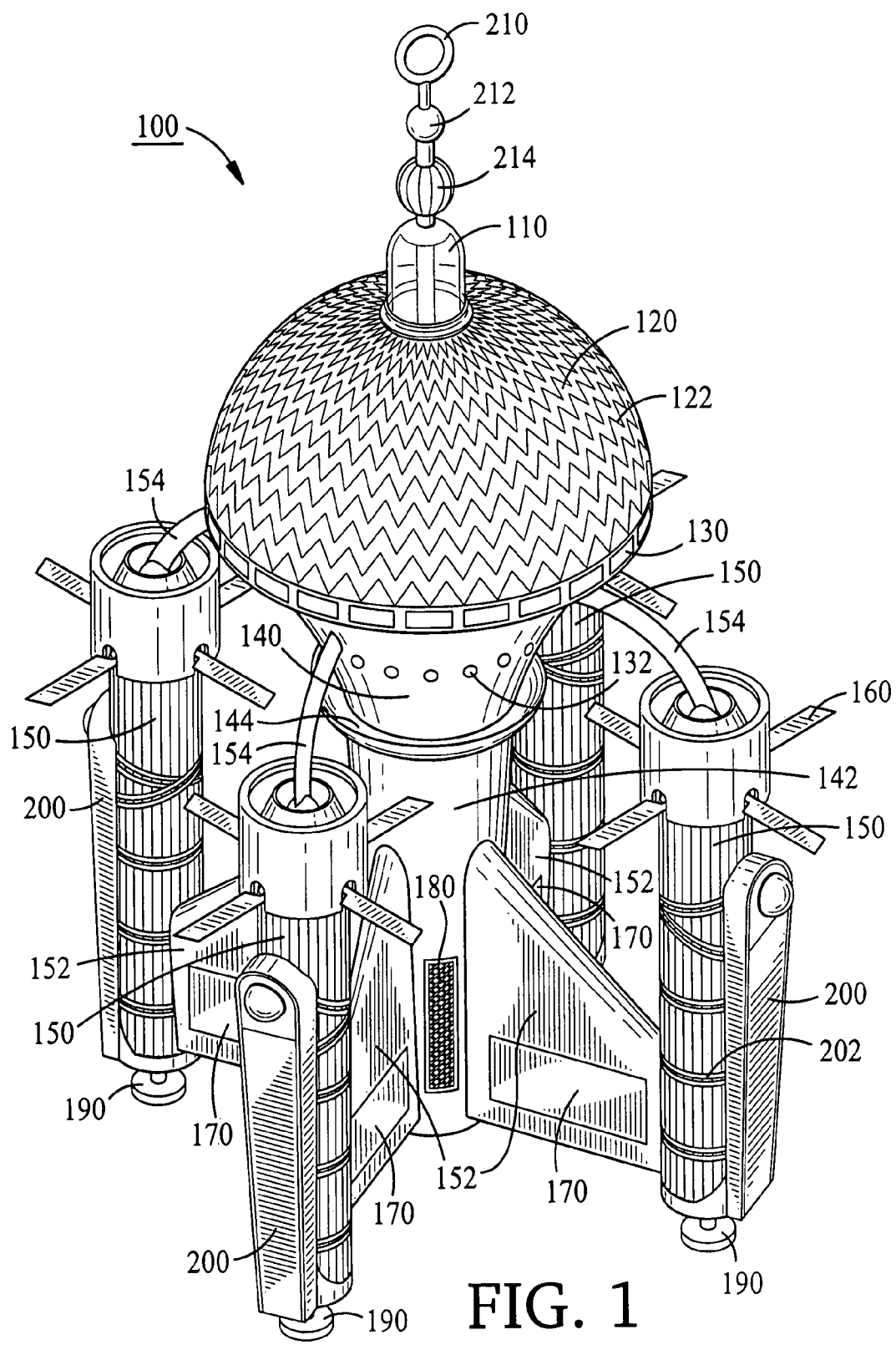
FIG. 1 is an isometric view of one embodiment of an aircraft according to the present invention.

Reference should now be made to the drawing figures on which similar or identical elements are given consistent identifying numerals throughout the various figures thereof, and on which parenthetical references to figure numbers, when used, direct the reader to the view(s) on which the element(s) being described is (are) best seen, although the element(s) may be seen on other figures also.

Figure 2:
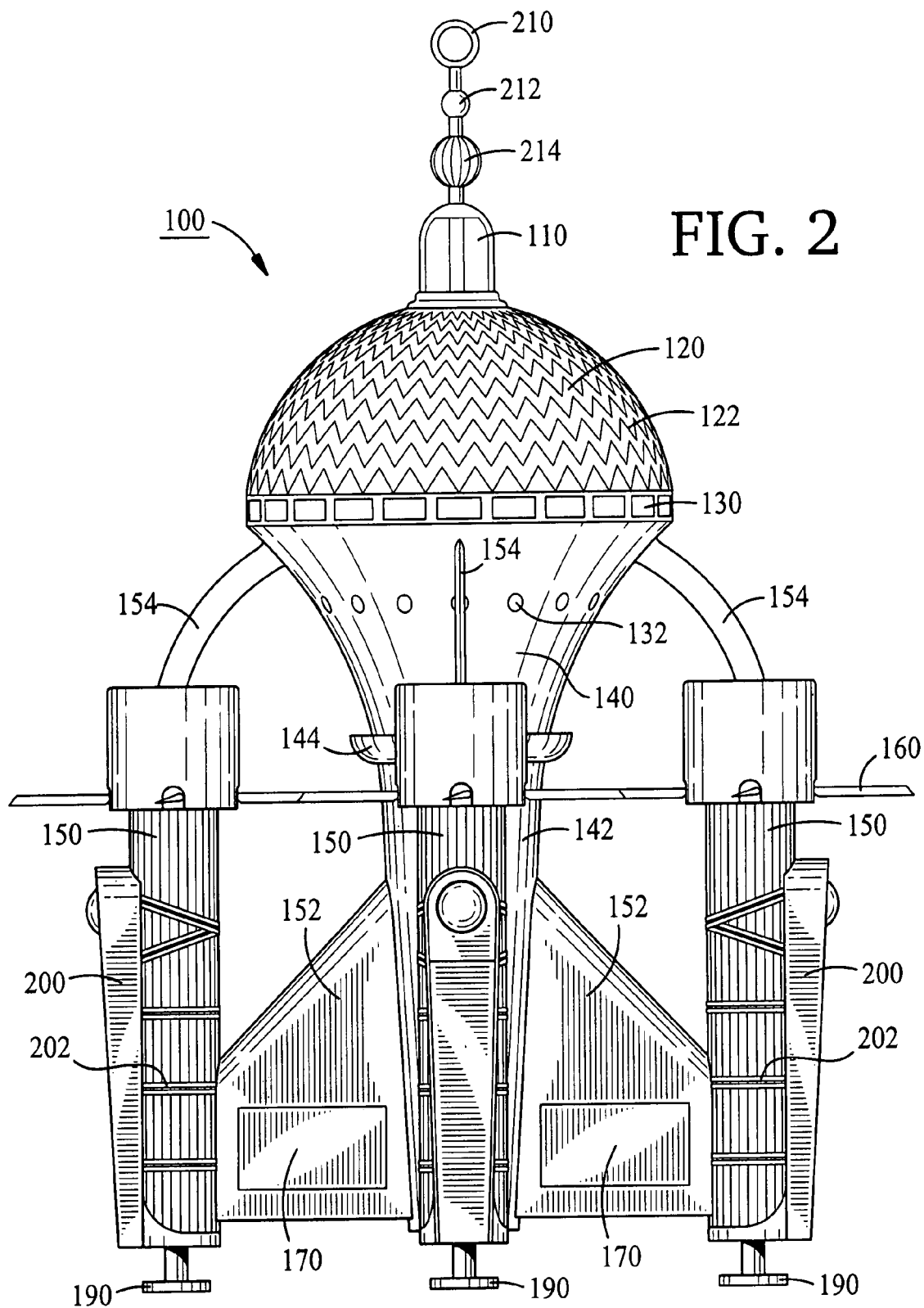
FIG. 2 is a side elevational view of the embodiment of FIG. 1.

FIGS. 1 and 2 illustrate an aircraft, constructed according to the present invention, and generally indicated by the reference numeral 100. Aircraft 100 includes a transparent dome 110 near the top thereof, the dome being provided as a shield for the pilot of the aircraft. Aircraft 100 includes a centrally disposed upper portion 120 comprising an inverted hemisphere covered with a plurality of Z-shaped, overlapping zig-zag tiles, as at 122. A plurality of windows, as at 130, is disposed at the lower edge of the upper portion 120 and a plurality of lights, as at 132, is disposed in an inverted truncated conical transitional portion 140 connecting the upper portion to a generally cylindrical lower portion 142. The diameter of the upper end of generally cylindrical lower portion 142 is slightly greater than the diameter of the lower end thereof, while the diameter of the upper end thereof is less than the diameter of the lower end of the upper portion 120. A horizontal air intake 144 for a rocket motor (not shown) disposed in generally cylindrical lower portion 142 is disposed at the intersection of the transitional portion 140 and the lower end of upper portion 120.

Aircraft 100 includes four vertical columns 150 attached to lower portion 142 by four wings 152 and connected to transitional portion 140 by four support struts 154 (only three visible on FIGS. 1 and 2). Sixteen generally horizontal blades, as at 160, operatively connected to turboprop engines (not shown), four in each column 150, are disposed near the top of the columns. Of course, other than turboprop engines may be provided as well. Each wing 152 contains an elevator 170 (only three visible on FIG. 1 and only two visible on FIG. 2).

Generally cylindrical lower portion 142 includes four radiator grills, as at 180 (only one shown on FIG. 1 and none visible on FIG. 2), the radiators being disposed for engine cooling.

At the base of each vertical column 150 is a support pad 190 (only three visible on FIGS. 1 and 2) on which aircraft 100 generally is disposed. On each vertical column 150 is disposed an outwardly facing landing gear 200 (only three visible on FIGS. 1 and 2) strapped to its respective vertical column by means of straps, as at 202. The construction and operation of landing gears 200 is described in more detail, infra.

A vertical top mast centrally disposed atop and rising vertically from transparent dome 110 on upper portion 120 includes at the distal end thereof a shock ring 210, a smooth primary sphere 212 underneath the shock ring, and a fluted secondary sphere 214 underneath the primary sphere.

Figure 3:
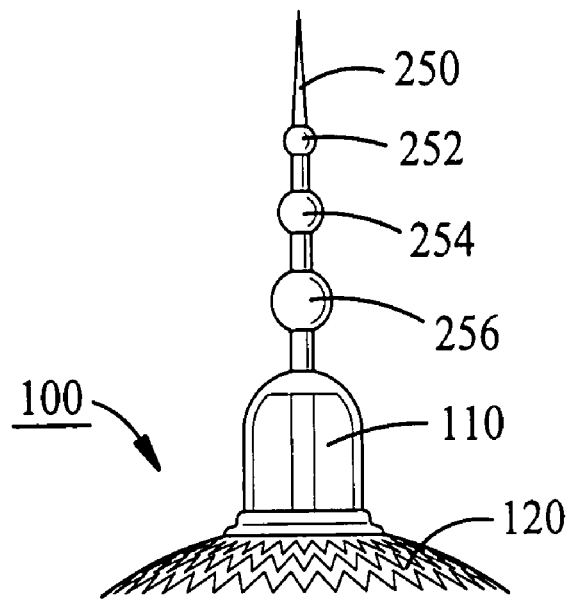
FIG. 3 is a fragmentary, isometric view of an alternative embodiment of the top mast of the aircraft.
Figure 4:
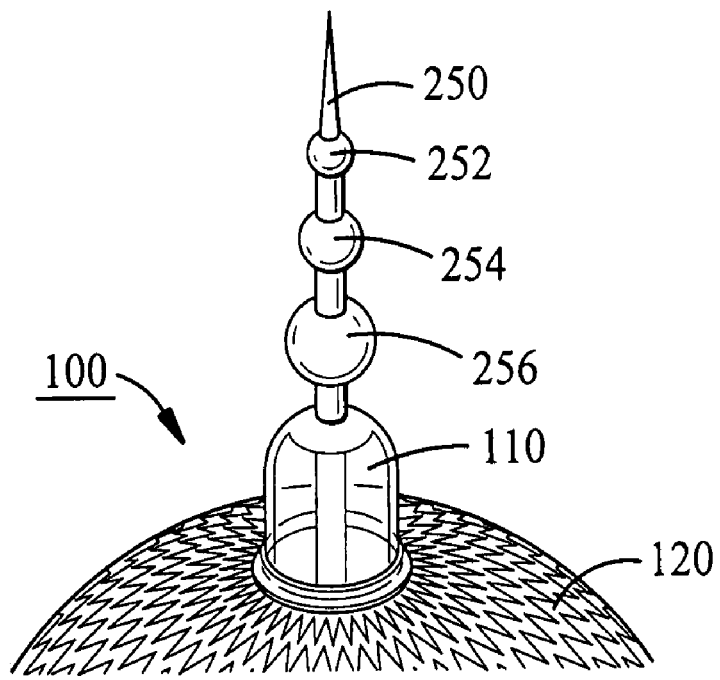
FIG. 4 is a fragmentary, side elevational view of the alternative embodiment of FIG. 3.

FIGS. 3 and 4 illustrate an alternative embodiment of the vertical top mast and includes a vertical pointed spike 250 at the top thereof, underneath which is a first spherical globe 252, underneath which is a second spherical globe 254 having a diameter greater than that of the first spherical globe, and underneath the second spherical globe is a third spherical globe 256 having a diameter greater that that of the second spherical globe.

Figure 5:
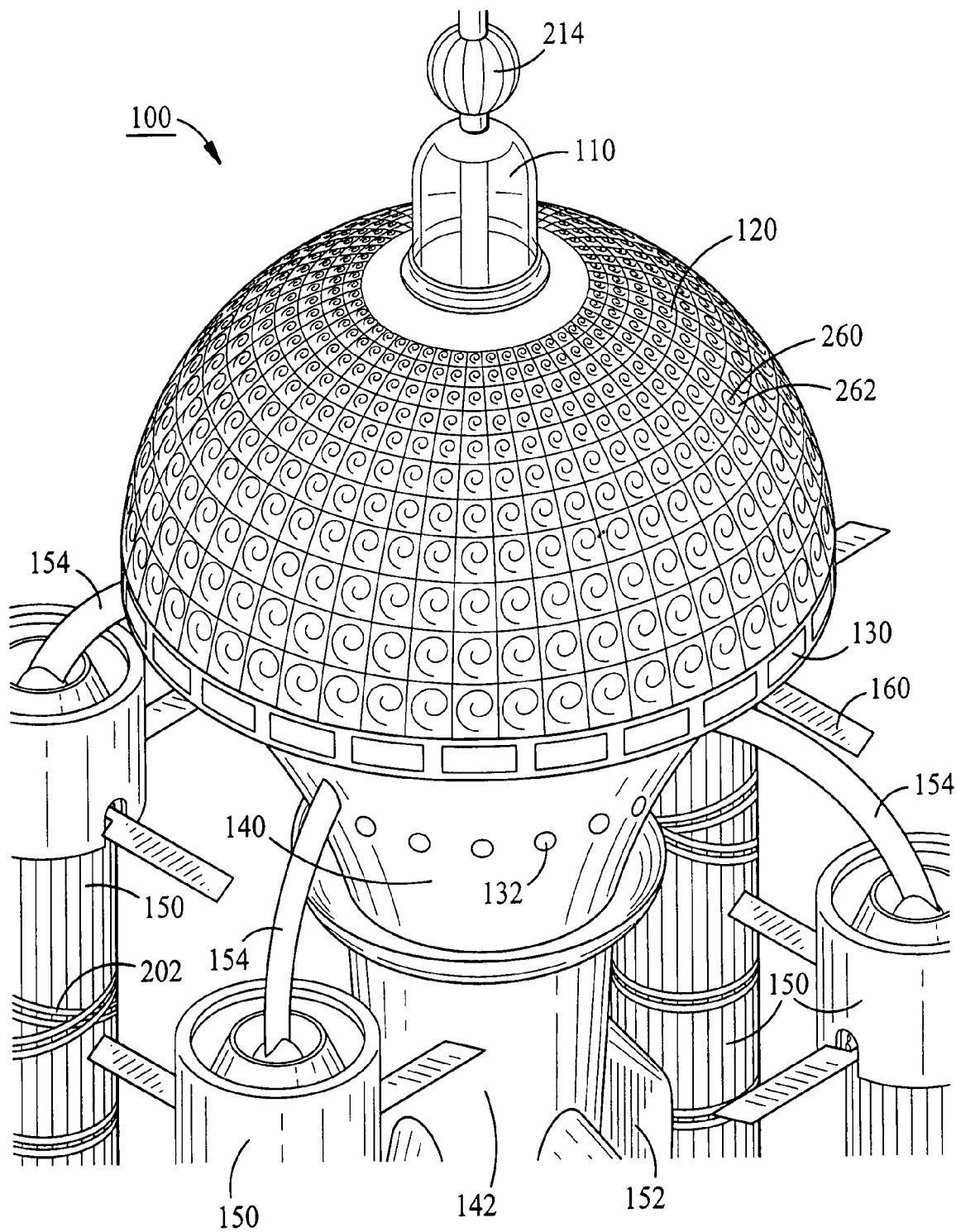
FIG. 5 is a fragmentary, isometric view of an alternative embodiment of the covering of the upper part of the aircraft.

FIG. 5 illustrates an alternative covering for upper portion 120, here a plurality of rosettes, as at 260, each disposed on a tile, as at 262.

Figure 6:
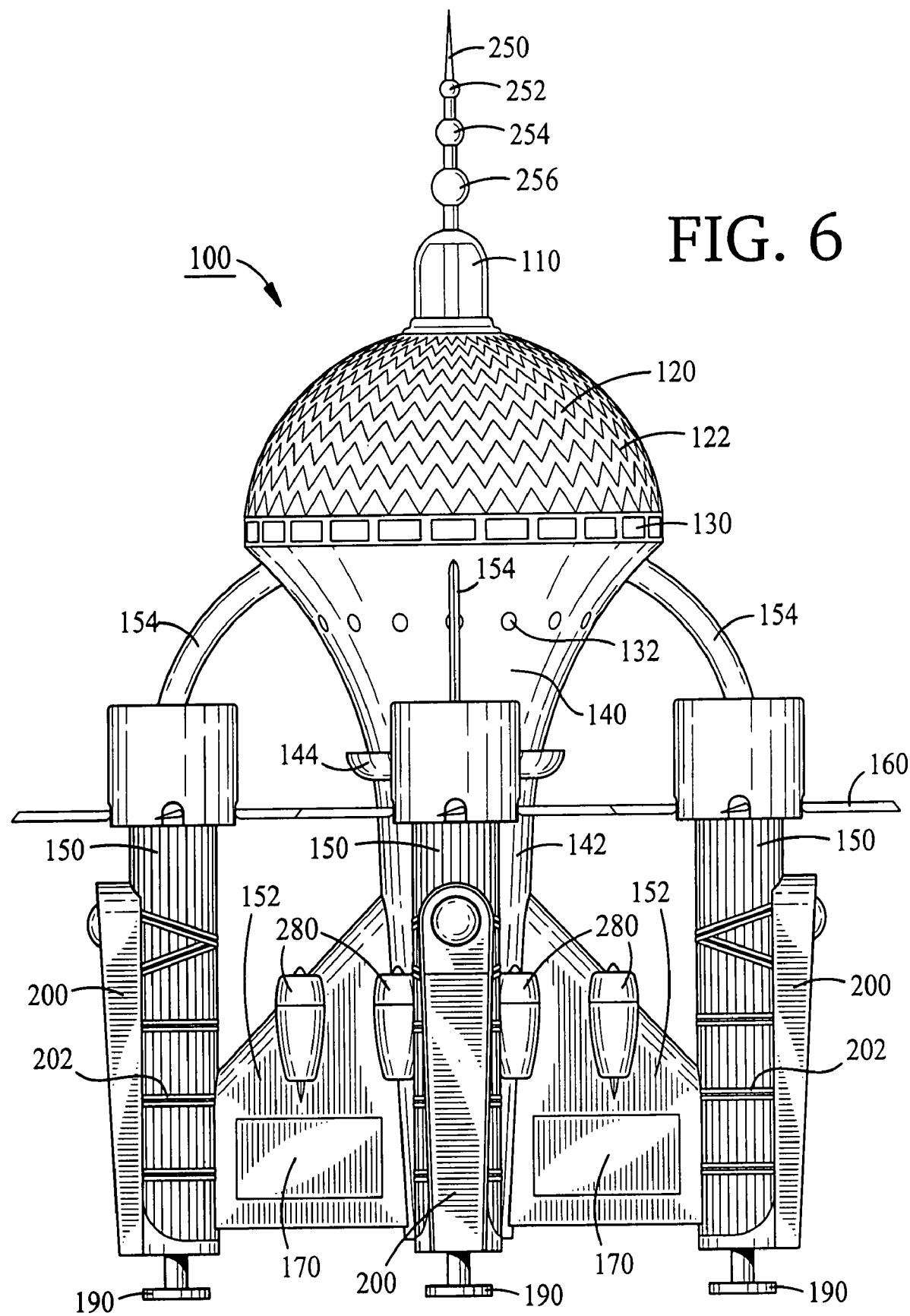
FIG. 6 is a side elevational view of the embodiment of FIG. 1 with jet engines disposed on the wings of the aircraft.

FIG. 6 illustrates pairs of vertically disposed jet engines 280 on each of wings 152 (only four shown on FIG. 6).

Figure 7:
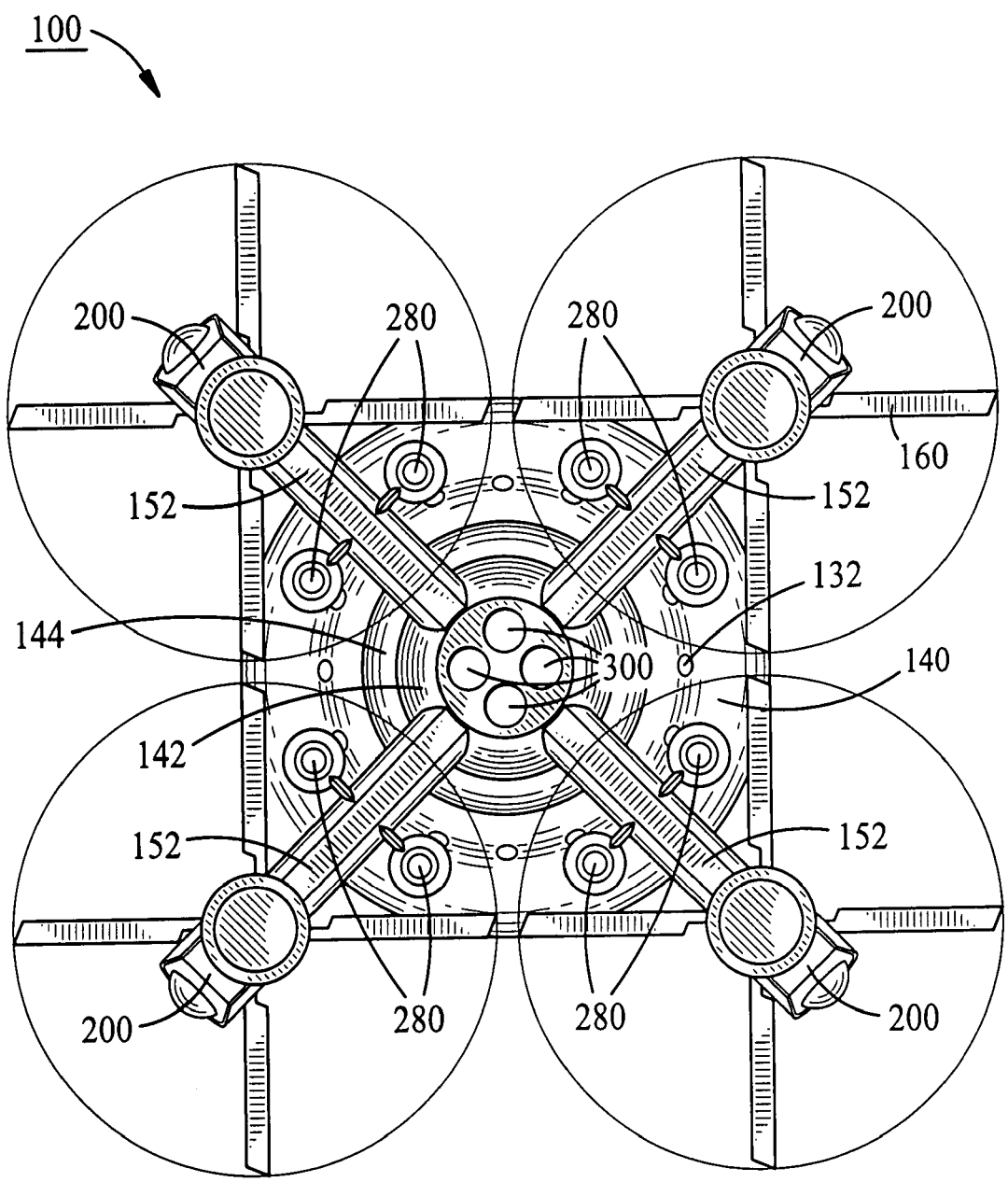
FIG. 7 is a bottom plan view of the embodiment of FIG. 6.

FIG. 7 illustrates a bottom plan view of the embodiment of FIG. 6 and also shows extending downwardly from a lower surface of generally cylindrical lower portion 142 four outlet nozzles 300 of the rocket engine (not shown) disposed in lower portion 142.

Figure 8:
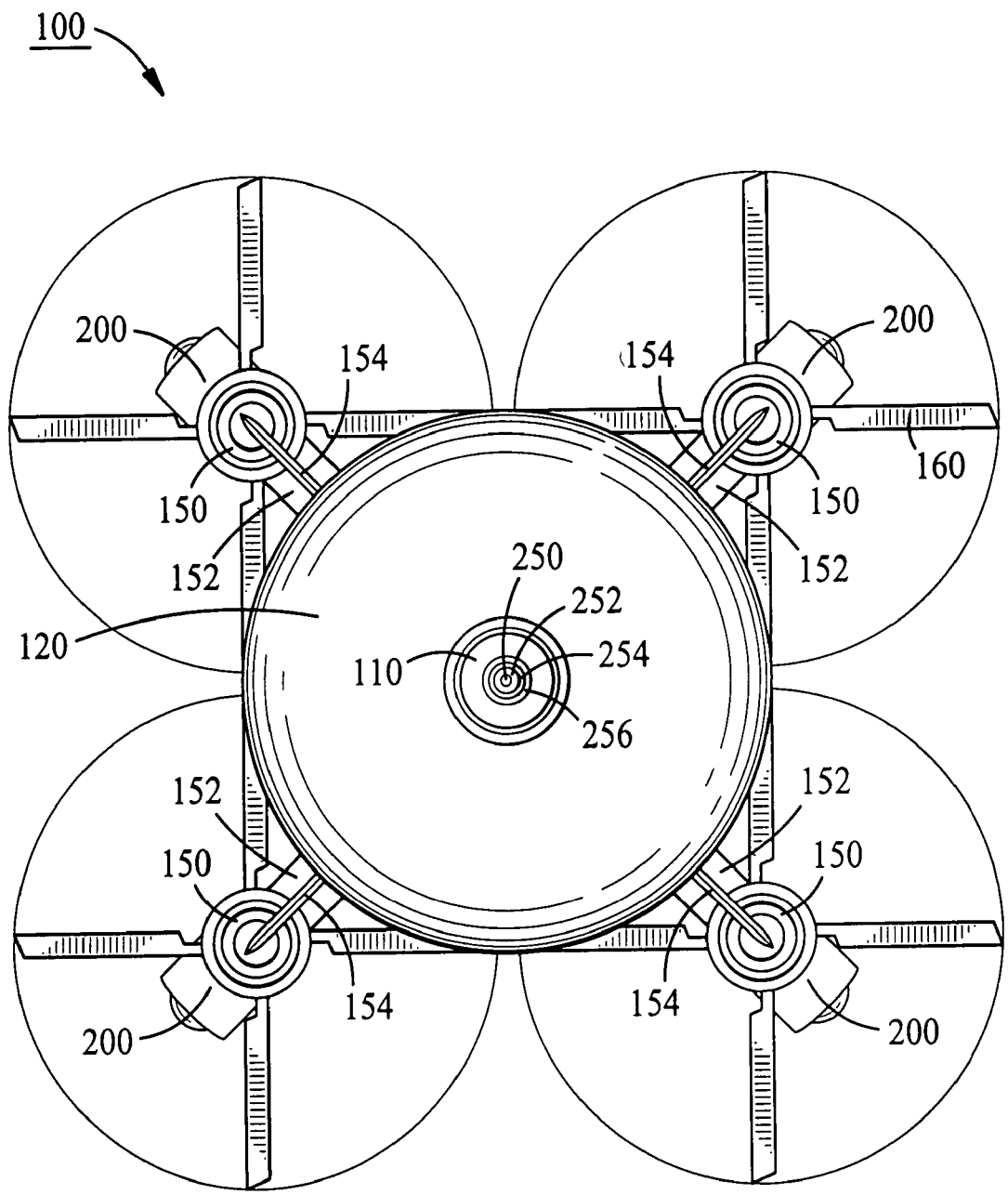
FIG. 8 is a top plan view of the embodiments of FIGS. 3, 4, and 6.

FIG. 8 illustrates a top plan view of the embodiment of FIGS. 3, 4, or 6, without the covering of top portion 120.

Figure 9:
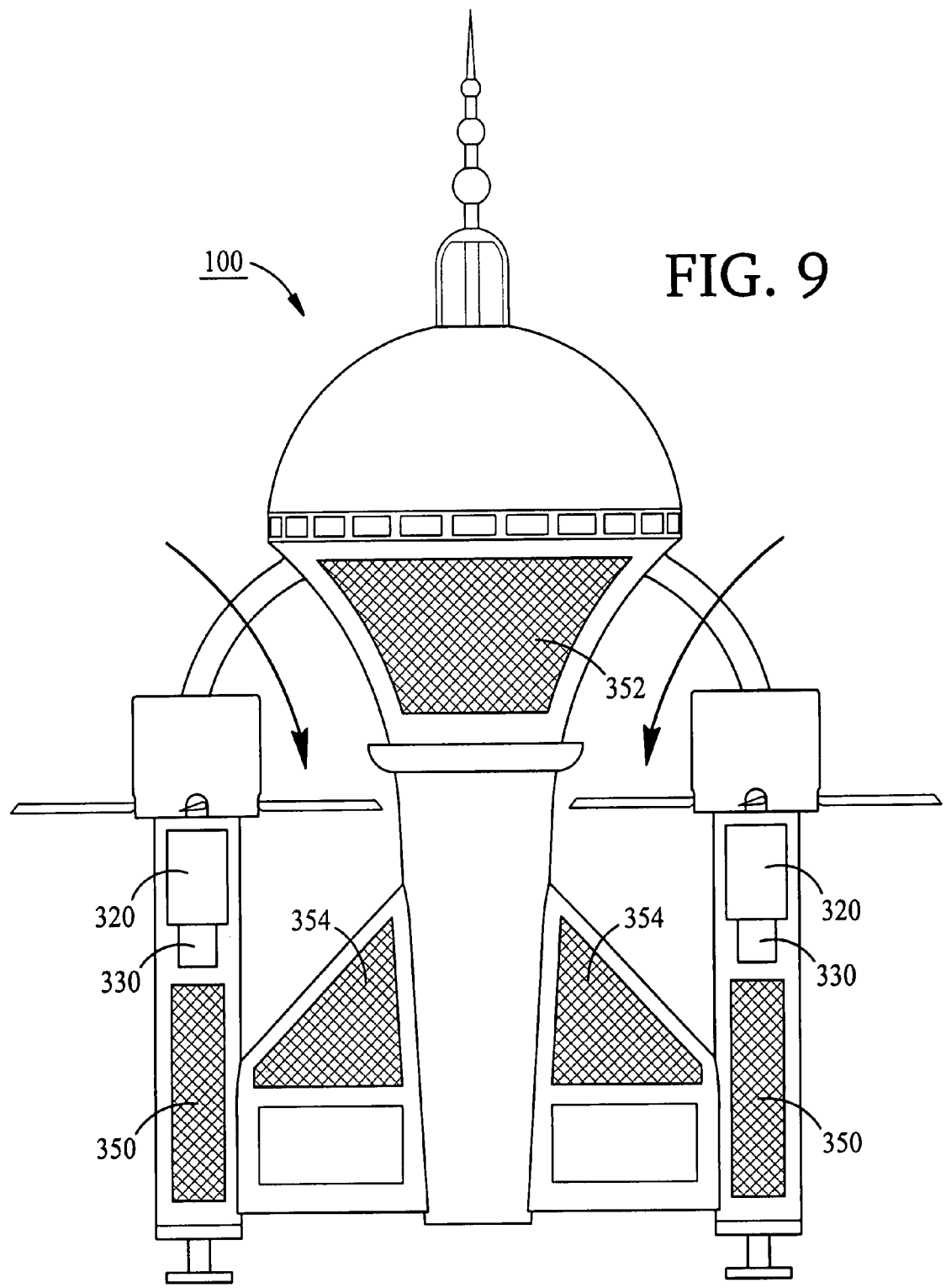
FIG. 9 is a side elevational, schematic view showing certain major elements of the aircraft of the present invention.

FIG. 9 illustrates schematically the engines 320, the generators 330 operatively connected to the engines, and fuel tanks 350, 352, and 354. Fuel tanks 350 may supply fuel to engines 320, fuel tank 352 may supply fuel to the rocket engine (not shown), and fuel tanks 354 may supply fuel to jet engines 280 (FIG. 6). Generators 330 may supply power to power-consuming elements of aircraft 100.

The arrows on FIG. 9 illustrate the symmetrical flow of air past aircraft 100 when the aircraft is in flight caused by the symmetry of aircraft 100. The shape of the fuselage of aircraft 100 also contributes to high lift.

Figure 10:
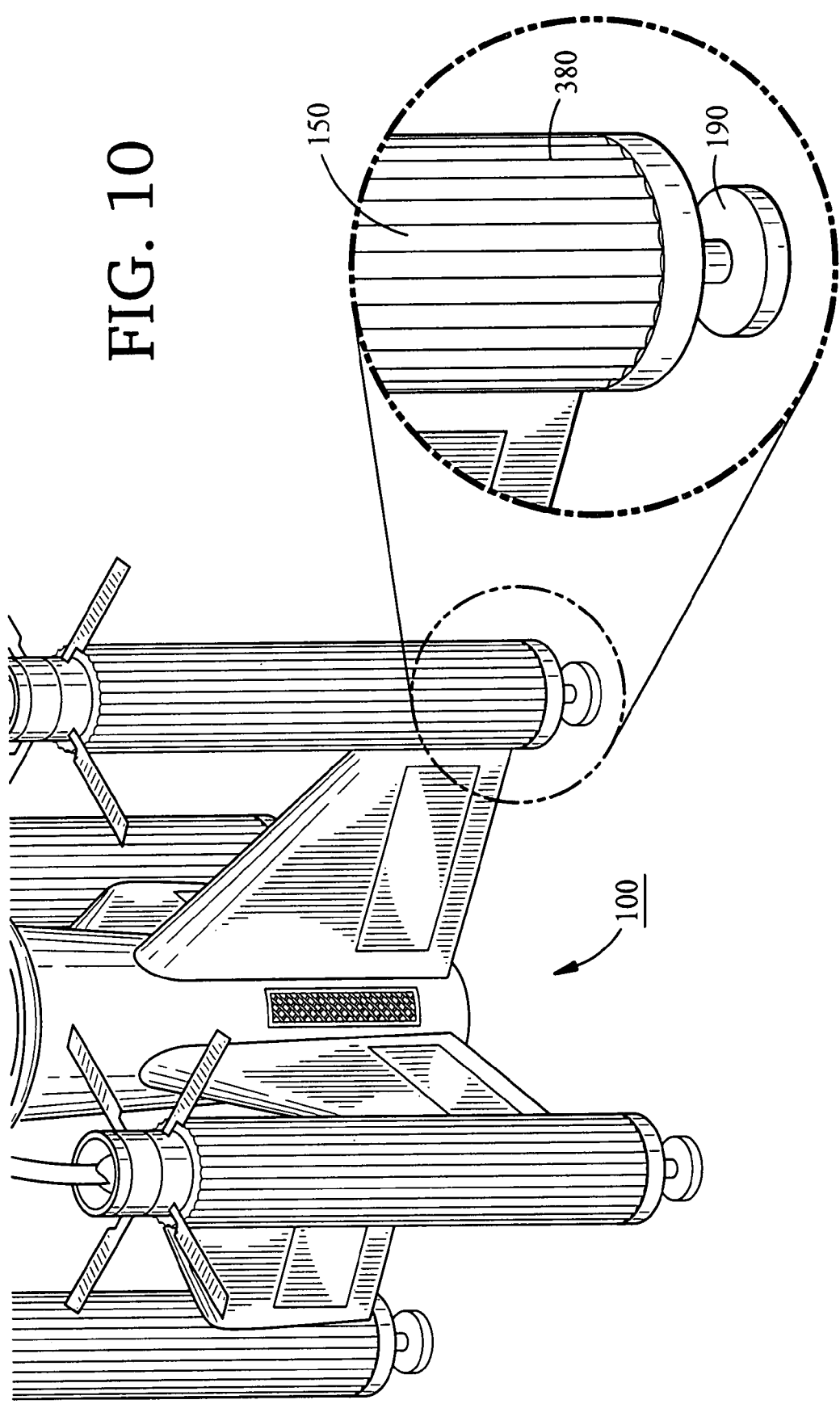
FIG. 10 is a fragmentary, isometric view showing a detail of the columns of the aircraft.

FIG. 10 illustrates that columns 150 (FIG. 1) may have vertical flutes, as at 380.

FIGS. 1-10 illustrate aircraft 100 in position for takeoff, or shortly after takeoff. At takeoff, aircraft 100 rests on support pads 190 (FIG. 1) which are disposed on a generally horizontal surface (not shown). At takeoff, horizontal blades 160 are rotating and are adjusted to their maximum pitches. The rocket engine (nozzles 300 shown on FIG. 7) is ignited. If jet engines 280 (FIG. 6) are used, they have been ignited. The thrust thus developed by the various engines causes aircraft 100 to take off.

Figure 11:
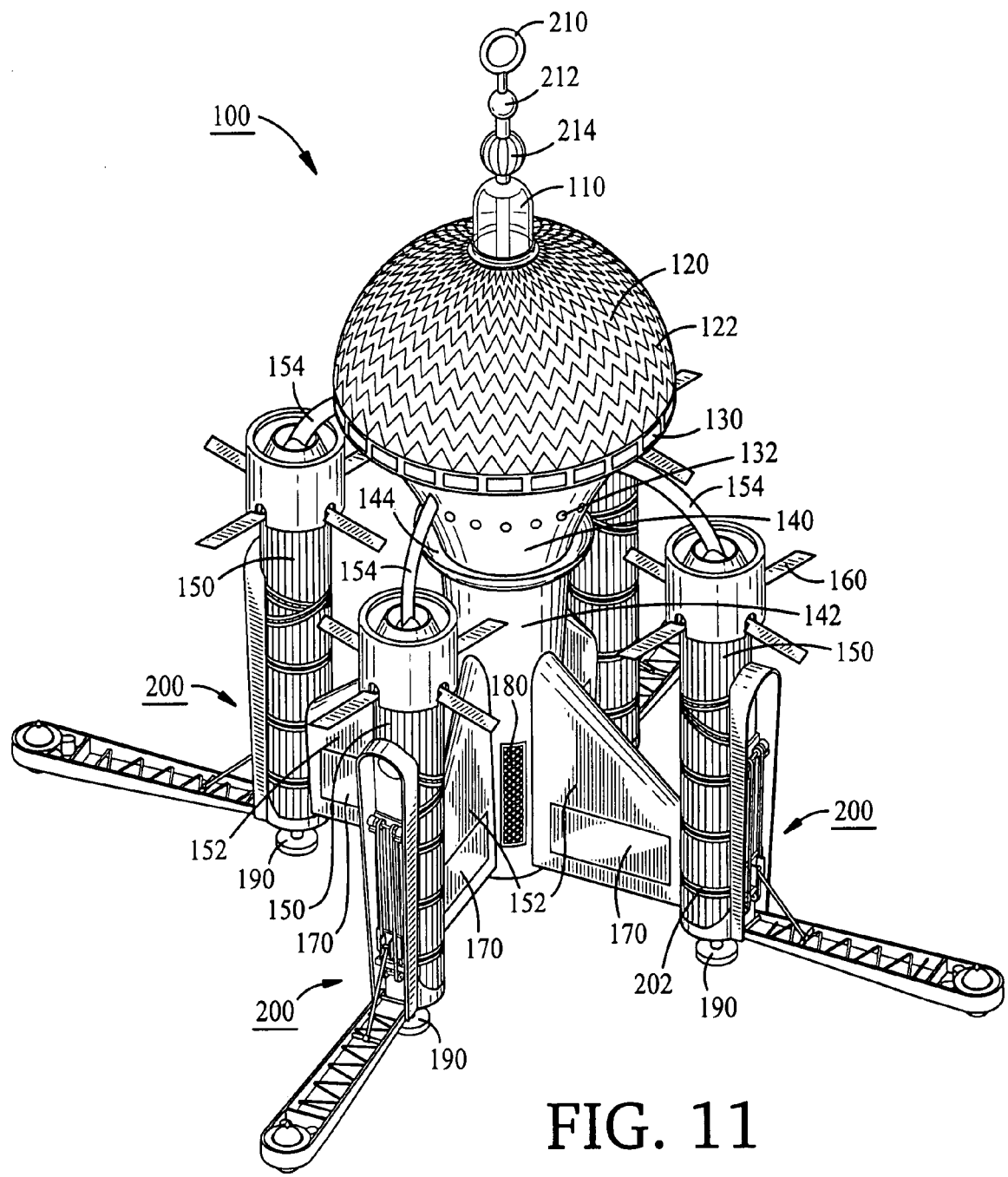
FIG. 11 is an isometric view of the aircraft with the landing gears thereof extended.

FIG. 11 illustrates landing gears 200 deployed for maneuvering aircraft 100 on a surface (not shown).

Figure 12:
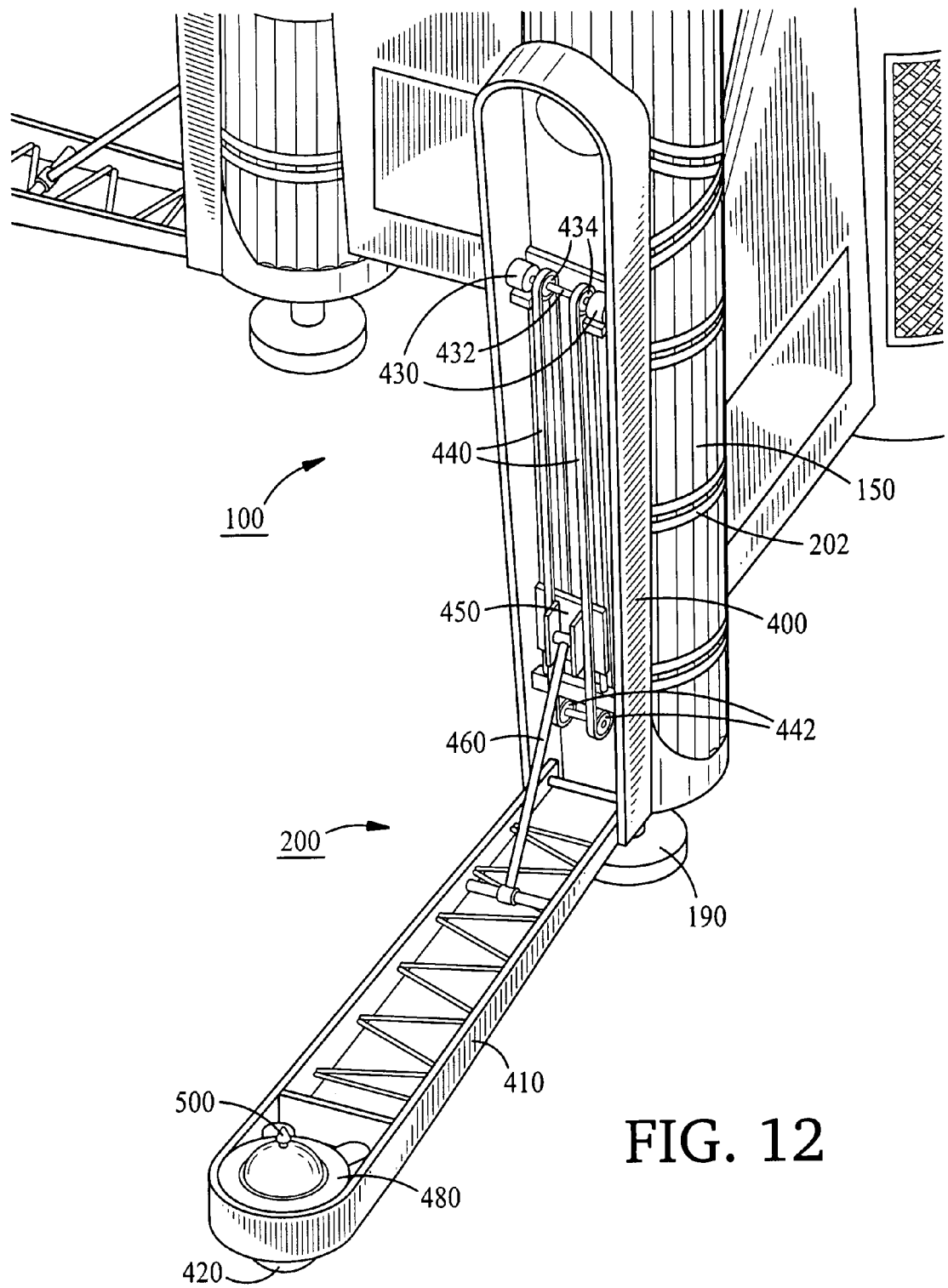
FIG. 12 is a fragmentary isometric view showing in more detail the mechanism of the landing gears of FIG. 11.

FIG. 12 illustrates in more detail the construction of a deployed landing gear 200. Landing gear 200 includes a generally vertical outer housing 400 that is strapped to a column 150 with a plurality of straps, as at 202. A support/drive housing 410 closes generally vertical outer housing 400 when the support/drive housing is in a retracted position (FIG. 1). It will be understood that a ball wheel 420 disposed at the distal end of support/drive housing 410 is below support pad 190 when the support/drive housing 410 is in the extended position shown.

Internally of generally vertical outer housing 400 are fixedly mounted two hydraulic motors 430 that are operatively connected to a horizontal shaft 432 on which is mounted two vertical drive pulleys 434. Drive pulleys 434 drive vertical two endless belts (or chains) 440 that are looped around at their bottoms two idler pulleys 442 fixedly disposed with respect to horizontal shaft 432. A plate 450 is fixedly attached to two vertical belts 440 such that the plate rides up and down in generally vertical outer housing 400. Rotatably attached to plate 450 and to support/drive housing 410 is a retraction/support strut 460. It will be understood that, as plate 460 is lowered in generally vertical outer housing 400, support/drive housing 410 will be extended as shown on FIG. 12, and, as plate 460 is raised in the generally vertical outer housing, the support/drive housing will be retracted to its closed position (FIG. 1).

Ball wheel 420 is disposed in ball drive assembly 480 and disposed atop the ball wheel, as shown on FIG. 12, is locking member 500, the structure and function of these elements being described in detail, infra.

Figure 13:
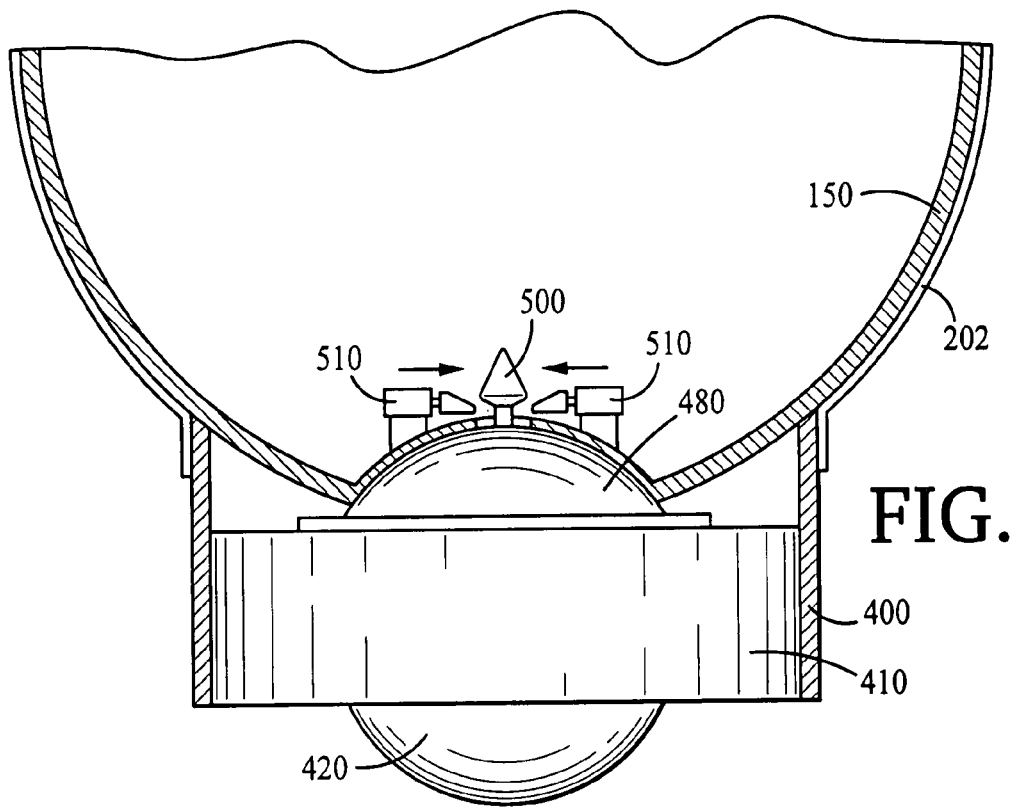
FIG. 13 is a top plan view of the locking mechanism of the landing gear of the aircraft, in unlocked position, but being locked.

FIG. 13 illustrates support/drive housing 410 being locked in retracted position. Two hydraulic cylinders 510 are fixedly mounted in column 150. Two catches 520 are fixedly disposed at the ends of two pistons 522 movable within the hydraulic cylinders, the catches being disposed so as to lock locking member 500 in place in column 150 as the catches are moved in the direction indicated by the arrows on FIG. 13.

Figure 14:
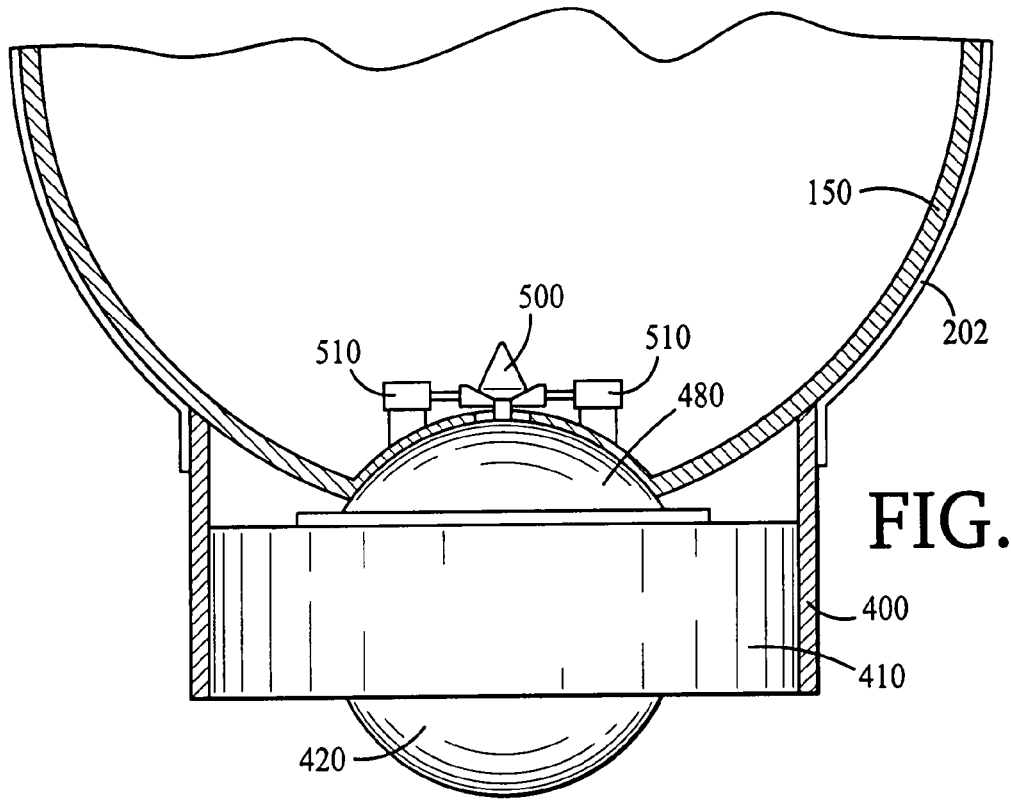
FIG. 14 is a top plan view of the locking mechanism of the landing gear of the aircraft in locked position.

On FIG. 14, catches 520 have fully engaged locking member 500 and support/drive housing 410 securely closes generally vertical outer housing 400.

Figure 15:
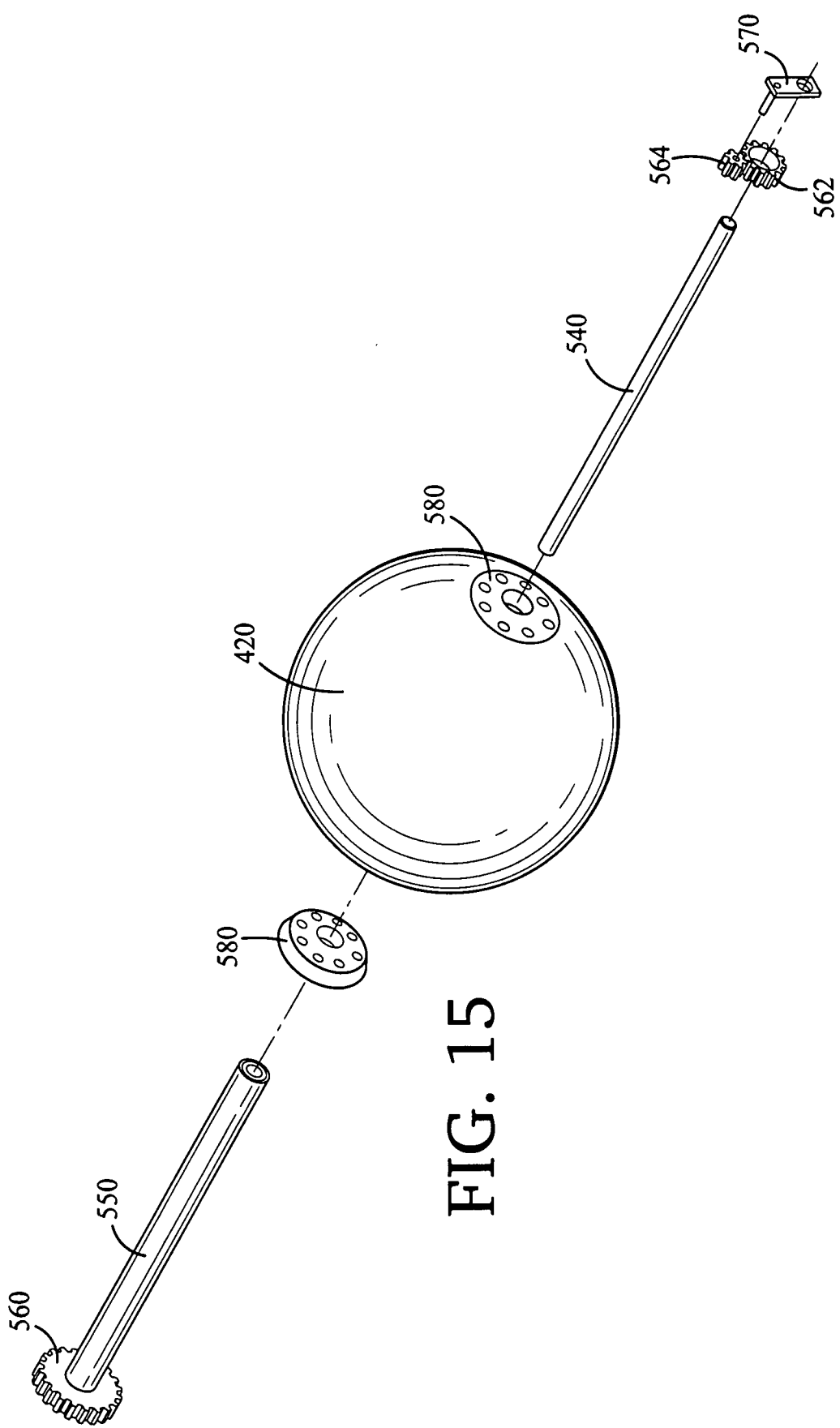
FIG. 15 is a partially exploded isometric view of a ball wheel with, inter alia, a drive shaft tube, a fixed axle, and drive gears.

FIG. 15 illustrates ball wheel 420 with a fixed axle 540 that is inserted through the ball wheel and a drive shaft tube 550 that fits rotatingly over the fixed axle. First and second drive gears 560 and 562, respectively, are fixedly disposed at the ends of drive shaft tube and a counter gear 564 drives second drive gear 562. As will be seen, infra, this arrangement permits first and second drive gears 560 and 562 to be driven by a ring gear (not shown on FIG. 15). A bracket 570 is provided to hold counter gear 564. Ball wheel hubs 580 are fixedly disposed on either side of ball wheel 420 through which fixed axle 540 and drive shaft tube 550 pass.

Figure 16:
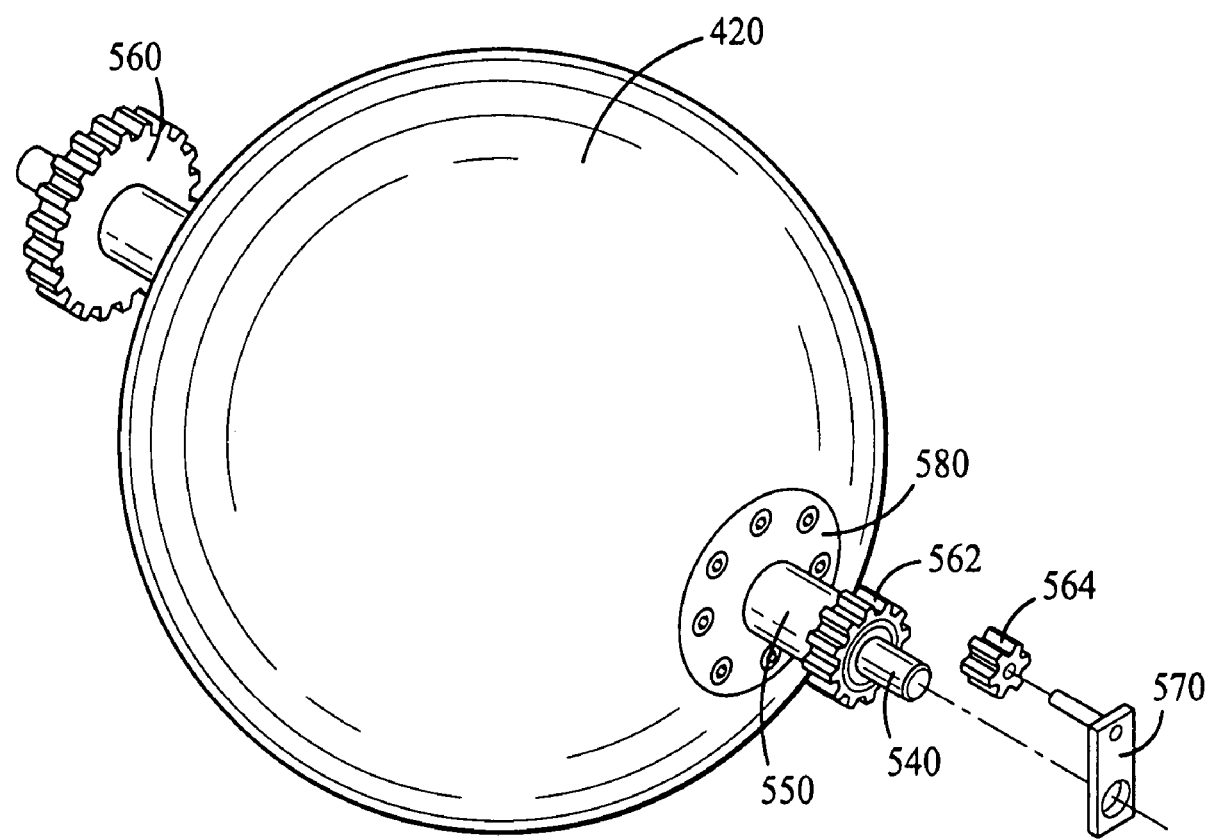
FIG. 16 is a partially exploded view of the elements in partially assembled relationship.

FIG. 16 illustrates the elements of FIG. 15 in partially assembled relationship.

Figure 17:
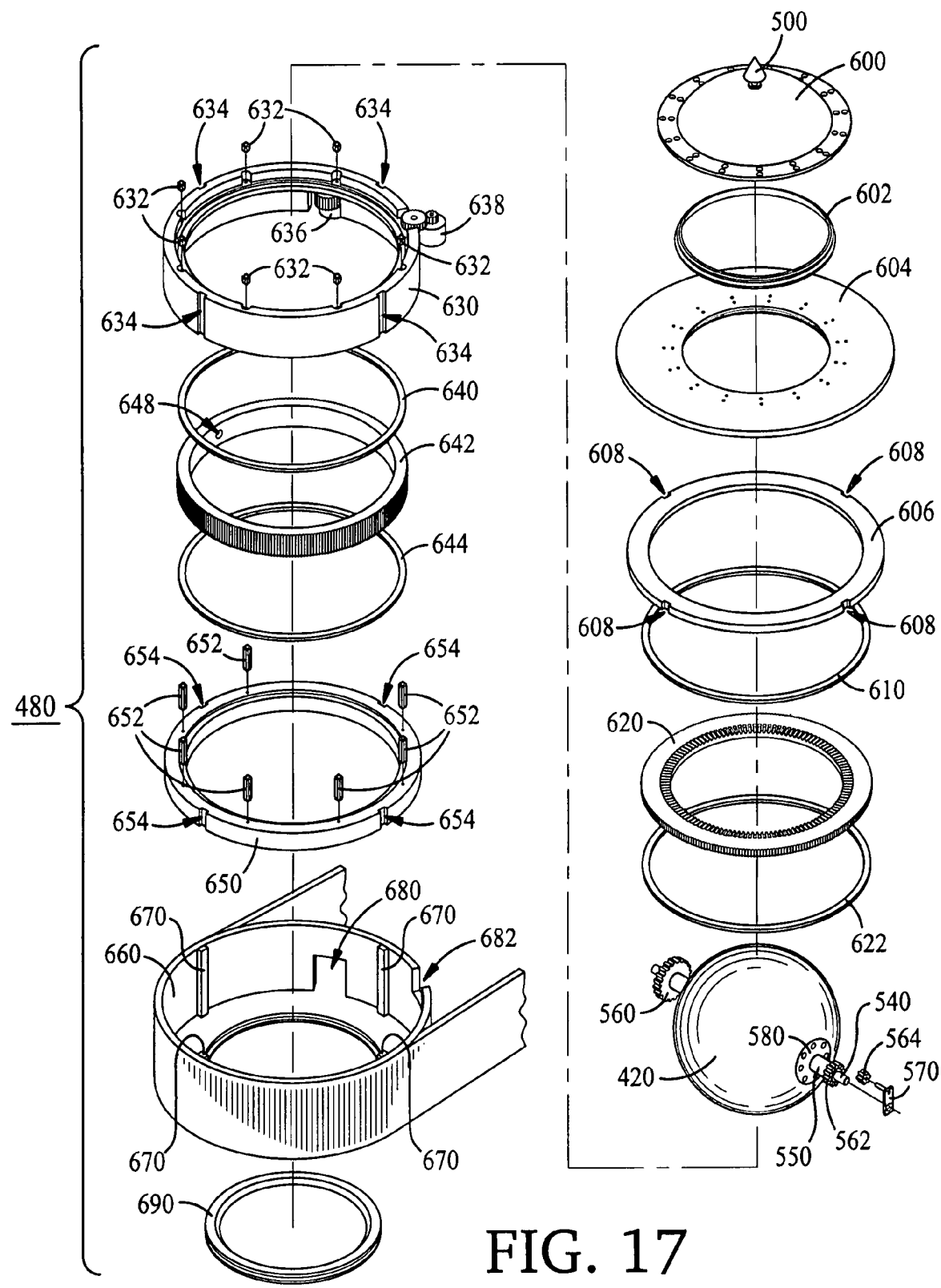
FIG. 17 is an exploded isometric view of the major components of the ball wheel assembly.

FIG. 17 is an exploded isometric view of the major elements of ball drive assembly 480. Starting at the top and working downwardly, first there is the locking member 500, then a top ball wheel cover 600, then a top gasket 602, then a ball housing cover 604, then a cover member 606, with four circumferentially equally spaced vertical slots formed on the outer periphery of the cover member, and then a first bearing ring 610. First bearing ring 610 includes (not shown in detail) top and bottom bearing races between which is disposed a plurality of needle bearings. Subsequent bearing rings have a similar same structure.

Continuing to refer to FIG. 17, next, there is a drive gear ring 620 (shown on FIG. 17 inverted for clarity), with teeth formed on its outer periphery and on its lower inside surface, followed by a second bearing ring 622, and then ball wheel 420. Next, is a ball wheel housing mid-section 630, with seven upper idler gears 632 vertically disposed in an upper portion thereof, and with four circumferentially equally spaced vertical slots 634 formed on the outer periphery of the ball wheel housing mid-section. Also shown with ball wheel housing mid-section 630 is a ball wheel steering motor and gearing 636, with the latter portion of that element extending into the interior of the ball wheel housing mid-section to engage teeth of a ball wheel steering gear. Also shown with ball wheel housing mid-section 630 is a ball wheel drive motor and gearing 638, with the latter portion of that element extending into the interior of the ball wheel housing midsection to engage the gear teeth formed on the outer periphery of drive gear ring 620.

Then, there is a third bearing ring 640, followed by a steering gear ring 642, with two holes 643 (only one visible on FIG. 17) for the journaling therein of fixed axle 540 and with teeth formed on its outer periphery, and then a fourth bearing ring 644. Next, there is a ball wheel housing base 650, with seven vertically disposed idler gears 652 rising from an upper surface of the ball wheel housing base, and with four circumferentially equally spaced slots 654 formed on the outer periphery of the ball wheel housing base.

Next, there is a ball wheel bearing housing 660 into the circular portion of which are disposed the above elements beginning with cover member 606. Four vertical flanges are formed on the interior periphery of the circular portion of ball wheel housing 660 to engage slots 608, 634, and 654 to keep the respective elements of which the slots are a part from rotating with respect to the wheel bearing housing. Also shown as part of ball wheel housing 660 are cutouts 680 and 682 to accommodate, respectively, steering motor and gearing 636 and drive motor and gearing 638. Finally, there is a bottom gasket 690.

Figure 18:
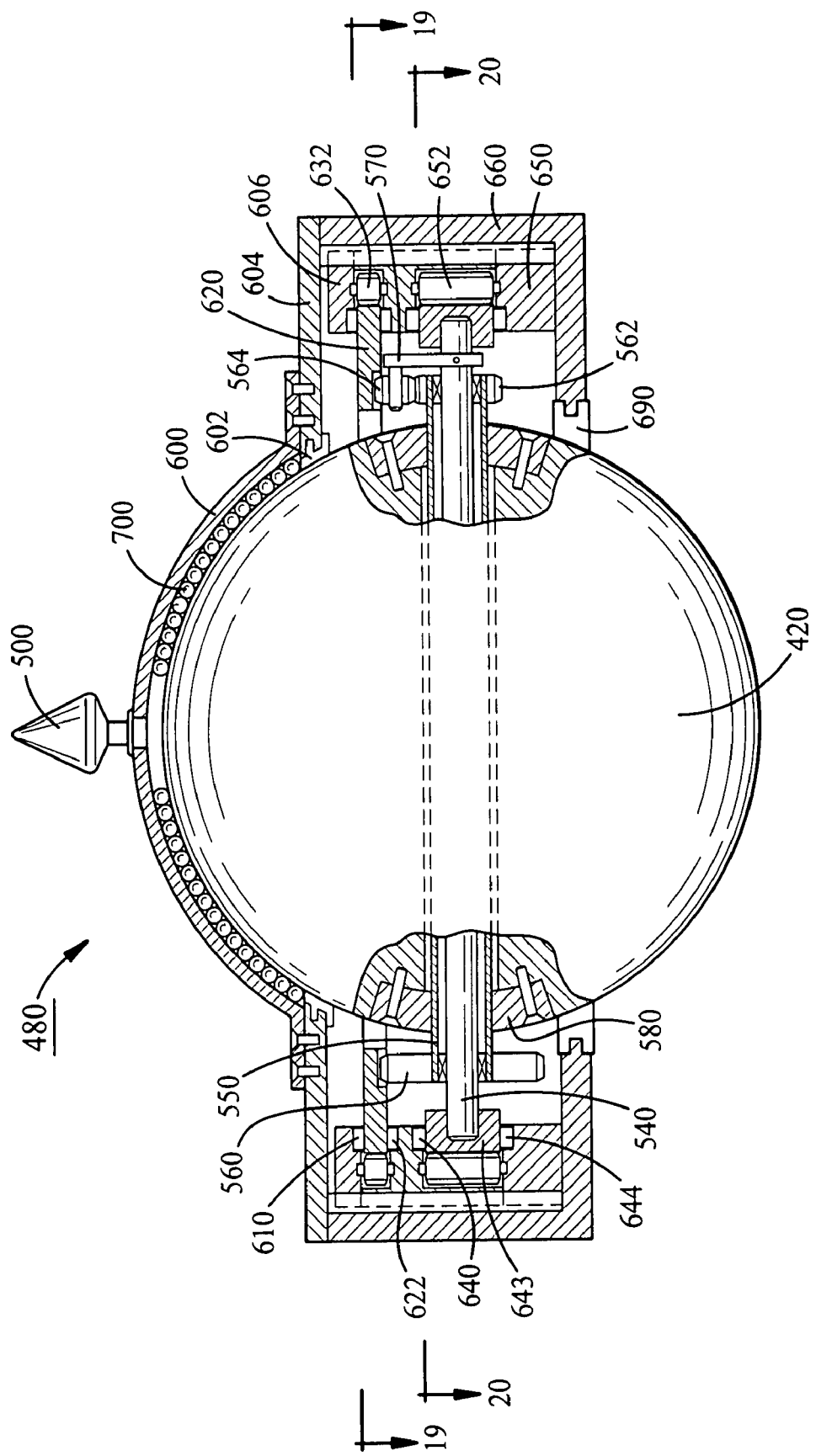
FIG. 18 is an end elevational view, partially in cross-section, of some of the components of the ball wheel assembly in assembled relationship.

FIG. 18 illustrates some of the major elements of wheel drive assembly 480 in assembled relationship. A description of these elements of ball drive assembly 480 is given with reference to FIG. 17. In addition, bearing balls, as at 700, are disposed between ball wheel 420 and ball wheel cover 602 to bear some of the load presented by the ball wheel.

Figure 19:
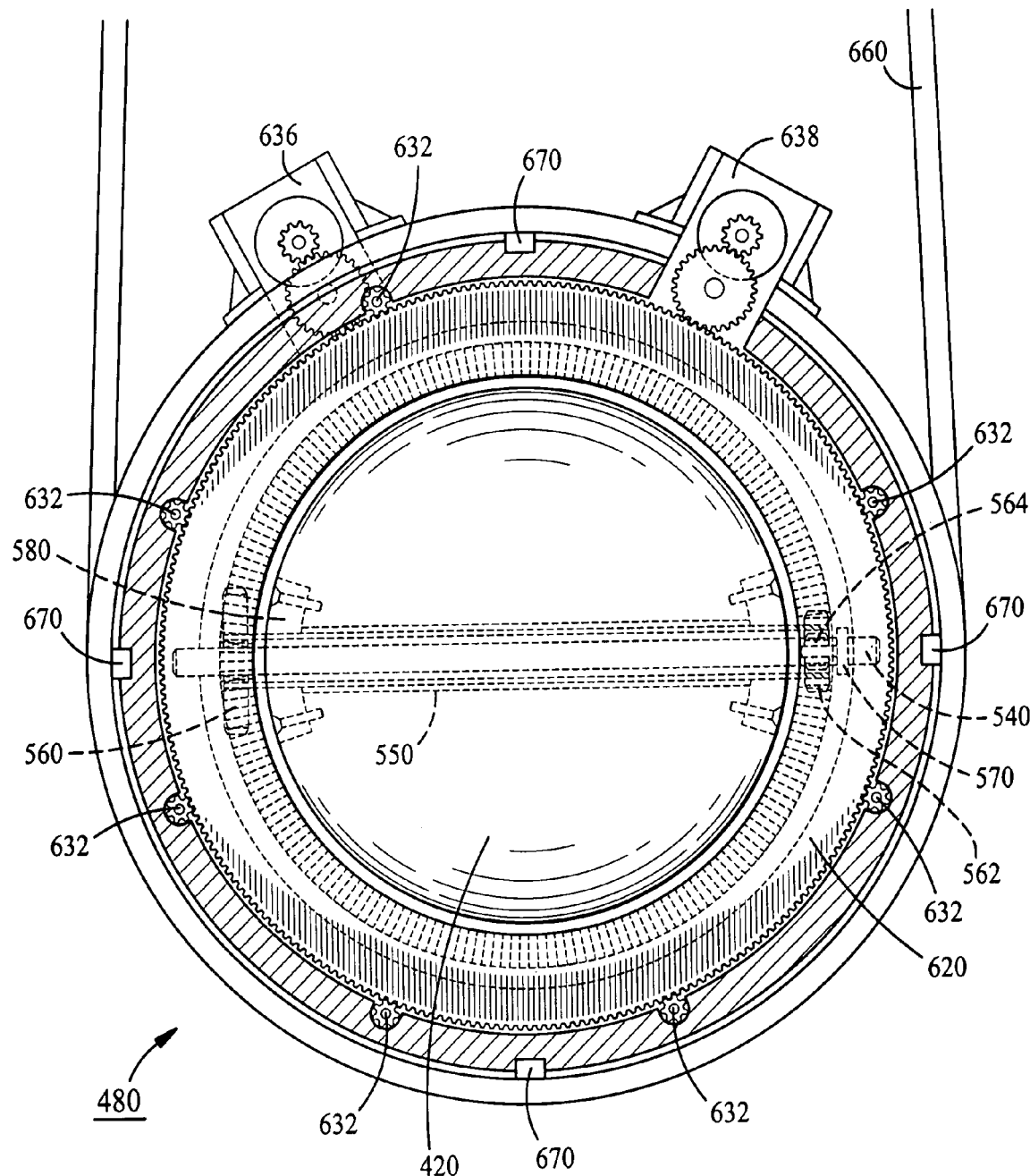
FIG. 19 is a fragmentary top elevational view, partially in cross-section, taken along line "19-19" of FIG. 18.

FIG. 19 illustrates some of the major elements of ball wheel drive assembly 480 in assembled relationship. A description of these elements of ball drive assembly 480 is given with reference to FIG. 17.

Figure 20:
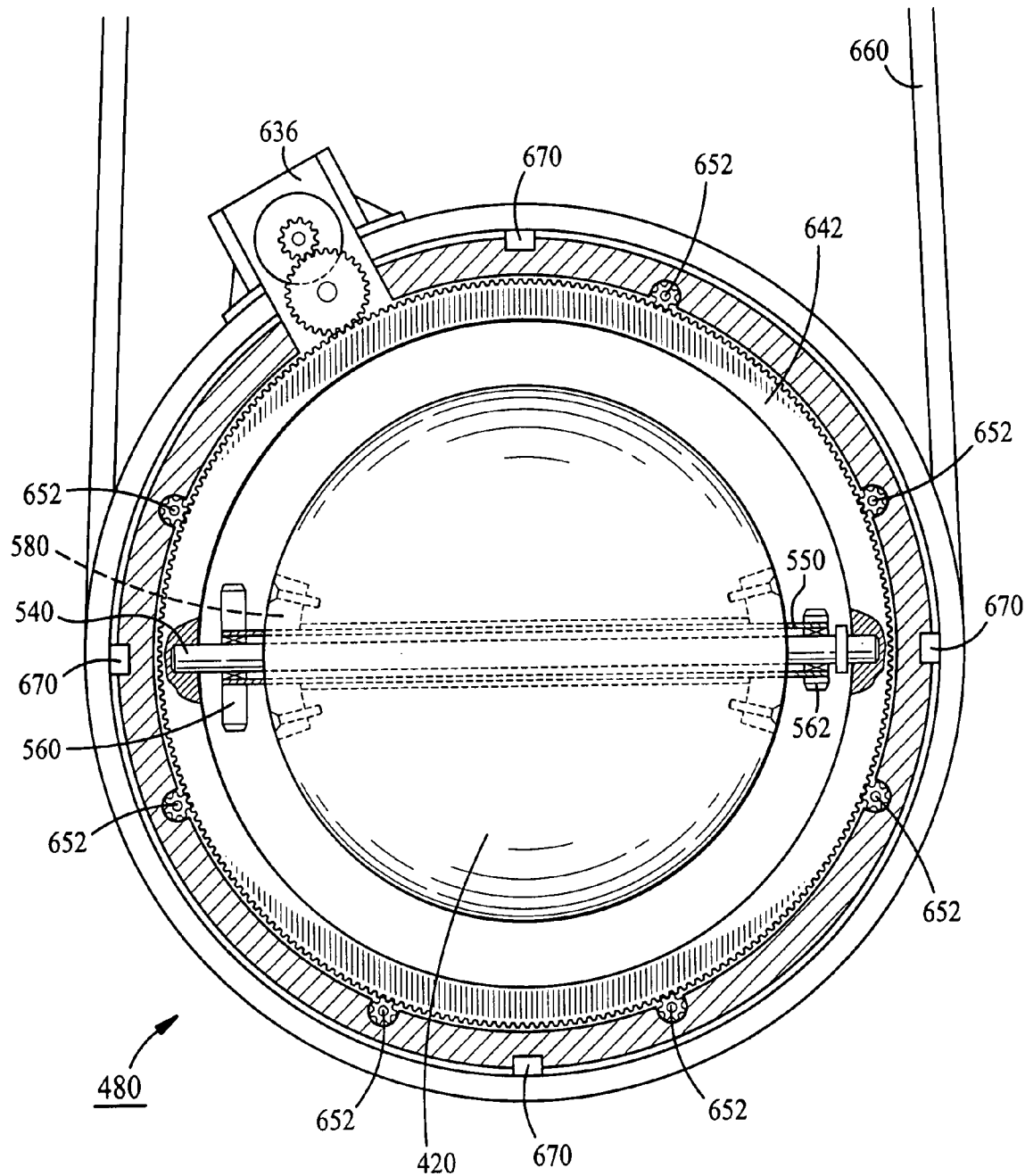
FIG. 20 is a fragmentary top elevational view, partially in cross-section, taken along line "20-20" of FIG. 18.

FIG. 20 illustrates some of the major elements of ball wheel drive assembly 480 in assembled relationship. A description of these elements of ball drive assembly 480 is given with reference to FIG. 17.

Figure 21:
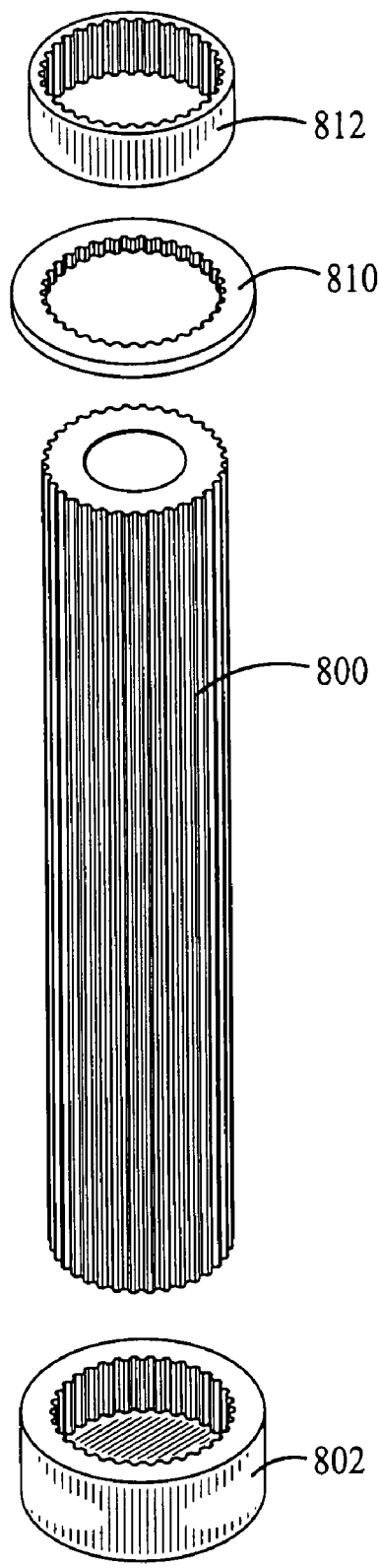
FIG. 21 is an isometric view showing some of the major elements of the propeller raising and lowering mechanism.

FIG. 21 illustrates some of the major elements of the mechanism to raise and lower blades 160 (FIG. 1). At the heart of the mechanism is a vertical splined core 800 that, at its bottom, fits adjacent a clamp cap base 802. A tooth ring 810 having complementarily shaped teeth on its inner periphery fits over splined core 800 and a spacer ring 812 also having complementarily shaped teeth on its inner periphery fits over the splined core and engages and separates adjacent tooth rings 810.

Figure 22:
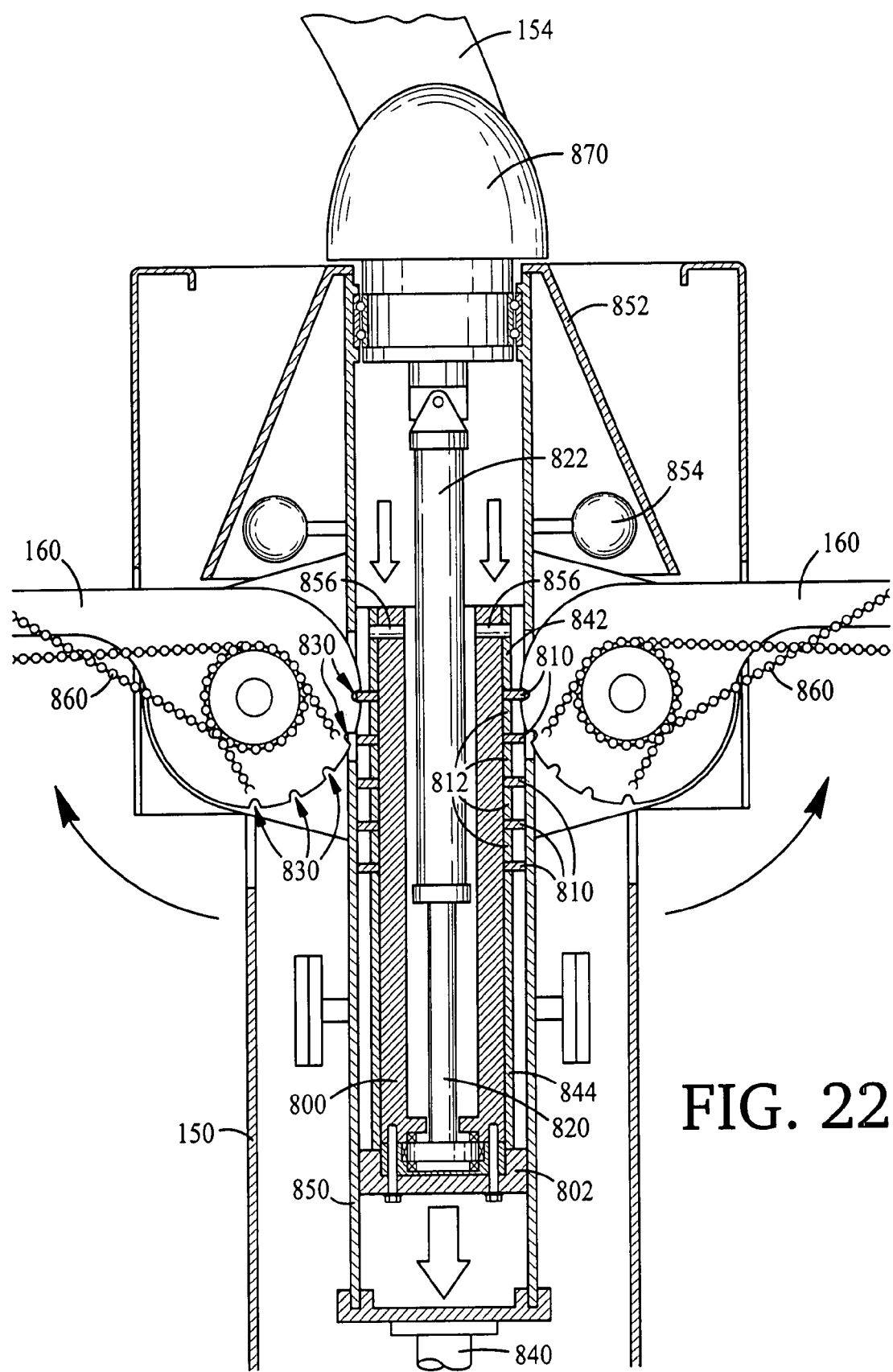
FIG. 22 is a fragmentary side elevational view showing, inter alia, the elements of FIG. 21 installed in a column of the aircraft, two of the blades of the rotor in a raised or operating position.

FIG. 22 illustrates the elements of FIG. 21 installed in a column 150. Blades 160 have been raised to their operating position by the piston 820 of a stationary hydraulic cylinder 822 lowering splined core 800, as is indicated by the arrows on FIG. 22, and a tooth ring 810 engaging uppermost indentations 830 in the proximal ends of blades 160. It will be understood that a second pair of blades 160 (not shown on FIG. 22) will be disposed orthogonal to the blades shown on FIG. 22. Rotational motion is imparted to the assembly by means of a rotating shaft 840 operatively connected to a motor 320 (FIG. 9). A short spacer ring 842 is disposed at the top of splined core 800 and a long spacer ring 844 is disposed at the bottom of the splined core.

Also shown as rotating elements on FIG. 22 are a vertical housing 850, a truncated cone 852, to compress incoming air, attached to the top of the vertical housing, four counterbalance balls 854 (only two shown on FIG. 22) fixedly attached to the housing, pins 856 to attach all the spacers to splined core 800, and ball chains 860, the function of which is described, infra.

Non-rotating elements shown on FIG. 22, in addition to piston 820 and hydraulic cylinder 822, include column 150, supporting strut 154, and a bull nose 870.

Figure 23:
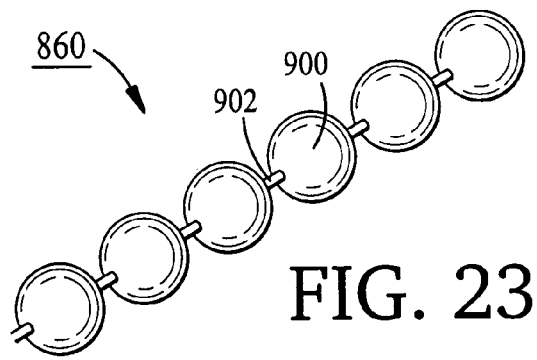
FIG. 23 is a fragmentary isometric view showing a portion of a ball chain.

FIG. 23 illustrates a ball chain 860 comprises a plurality of balls, as at 900, adjacent pairs of which are held together by pins, as at 902, having enlarged heads (not shown) at either end thereof. Ball chain 860 is highly flexible and strong.

Figure 24:
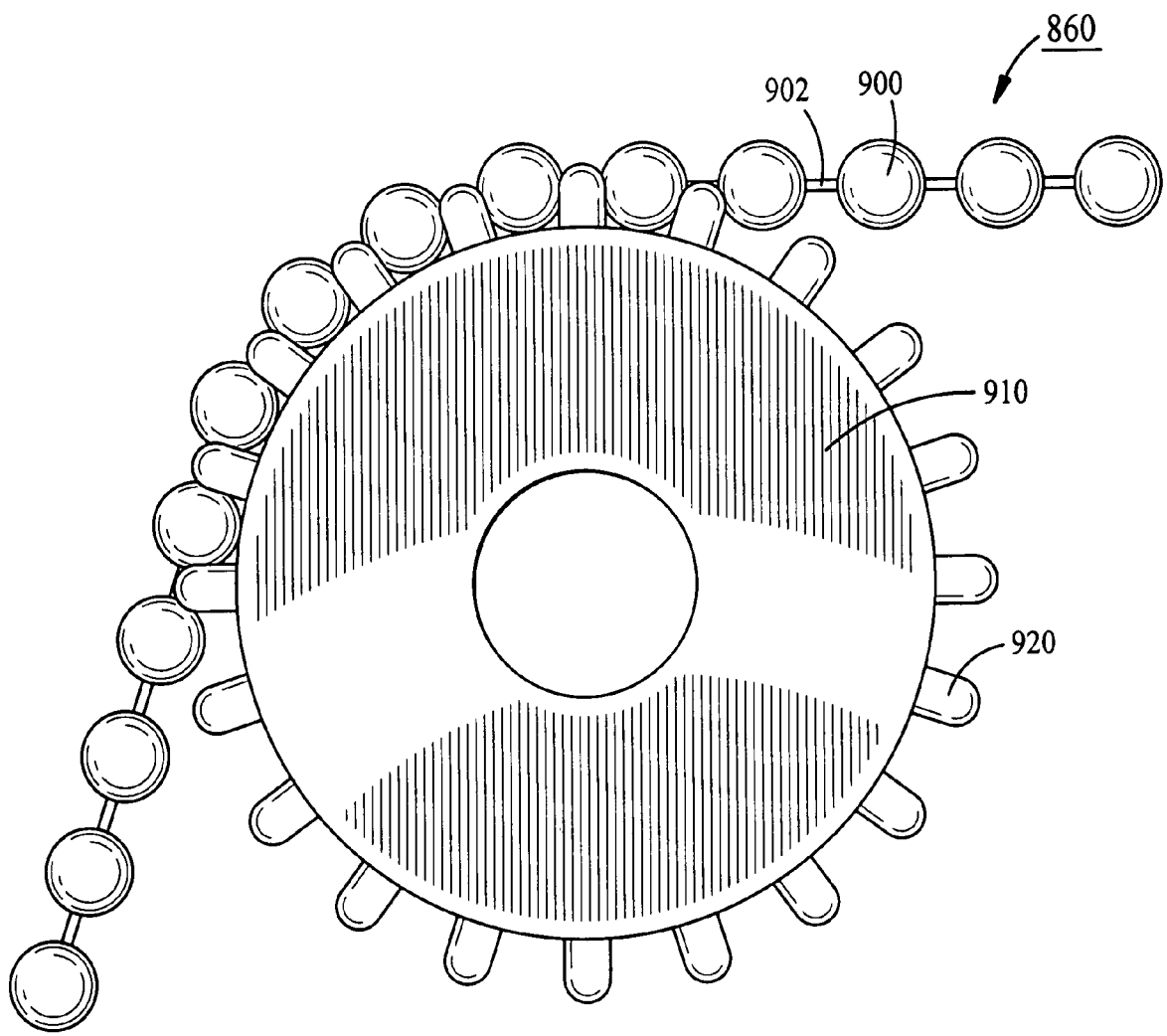
FIG. 24 is a fragmentary side elevational view showing a portion of a ball chain disposed over a ball chain engaging gear/pulley.

FIG. 24 illustrates ball chain 860 being engaged by a circular gear/pulley 910. Gear/pulley 910 has a plurality of teeth, as at 920, equidistantly spaced about the outer periphery of the gear/pulley, adjacent pairs of which teeth about the outer periphery of the gear/pulley engage one of the balls 900 of ball chain 860. Gear/pulley 910 may drive ball chain 860 or it may be an idler gear/pulley.

Figure 25:
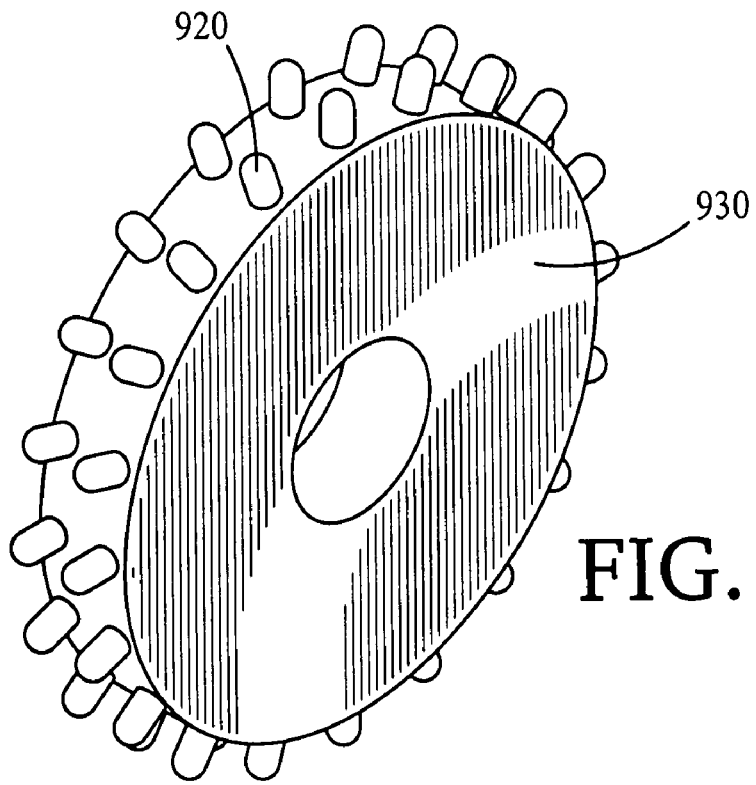
FIG. 25 is an isometric view of a gear/pulley for engaging a single ball chain.

FIG. 25 illustrates a gear/pulley 930 for engaging a single ball chain 860. It will be noticed that teeth 920 are disposed in side-by-side pairs, with each pair of teeth lying in a plane parallel to the central plane of gear/pulley 930.

Figure 26:
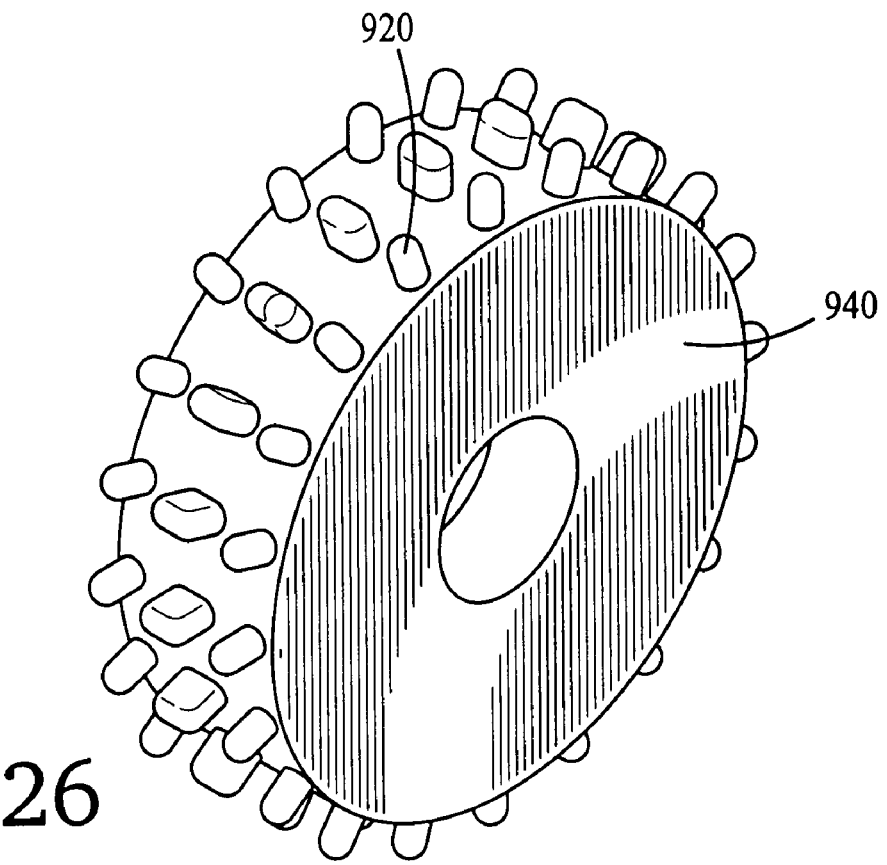
FIG. 26 is an isometric view of a gear/pulley for engaging two ball chains.

FIG. 26 illustrates a gear/pulley 940 for engaging two ball chains 860. It will be noticed that teeth 920 are disposed side-by-side three abreast, with each triplet of teeth lying in a plane parallel to the central plane of gear/pulley 940.

Figure 27:
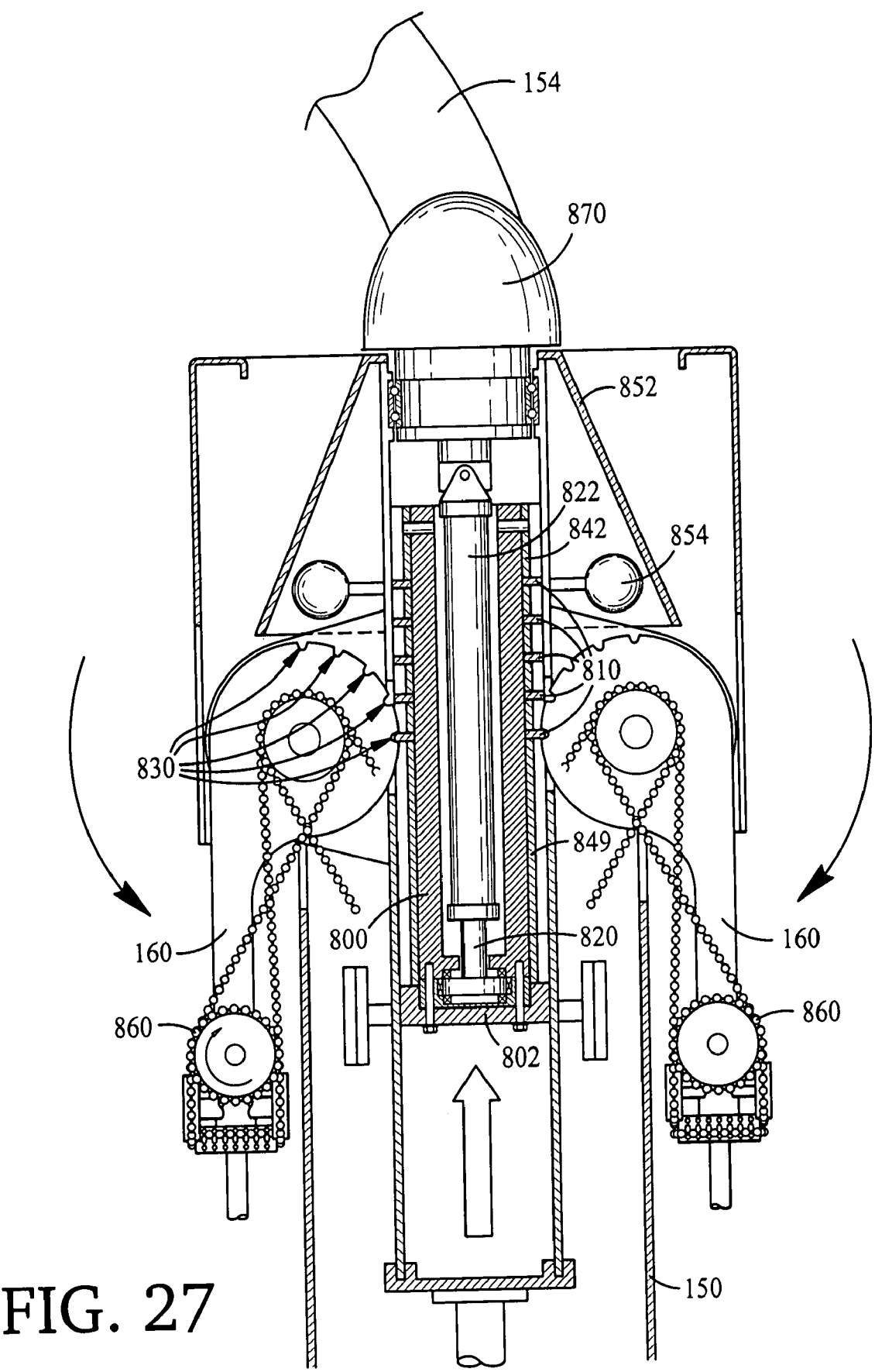
FIG. 27 is a fragmentary side elevational view showing, inter alia, the elements of FIG. 21 installed in a column of the aircraft, with two of the blades of the rotor in a lowered position.

FIG. 27 illustrates blades 160 in a lowered position, the blades having been brought to this position by the raising of splined core 800, in the direction of the arrow on FIG. 27, such that the lower of tooth rings 810 engages the lower of indentations 830 on the proximal ends of the blades. This is the position blades 160 assume when aircraft 100 (FIG. 1) has reached a certain speed. Of course, motor 320 (FIG. 9) would be shut off when blades 160 are lowered.

Figure 28:
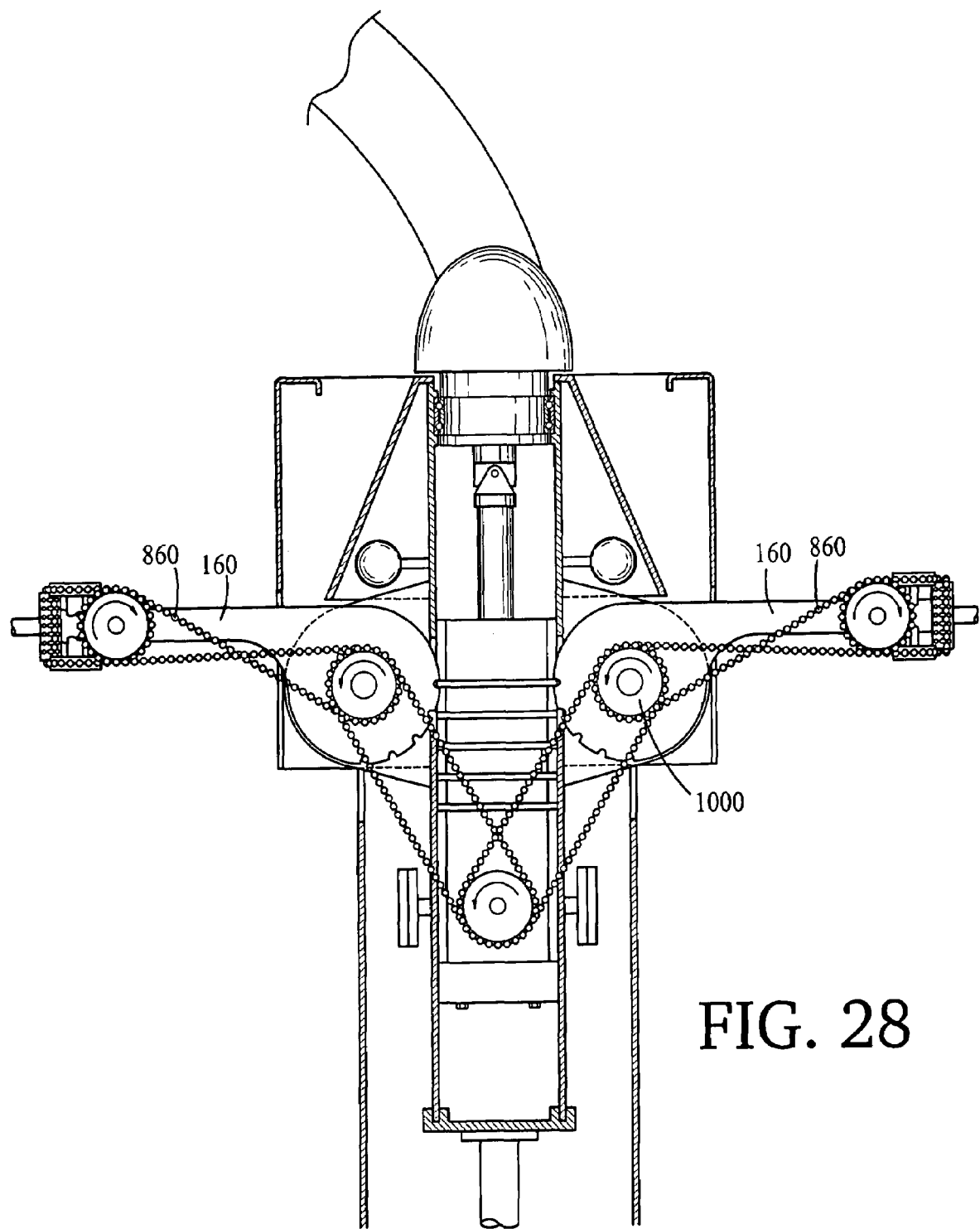
FIG. 28 is a fragmentary side elevational view showing how the ball chains are used to adjust the pitch of the distal ends of two of the blades, the blades being shown in their raised position.

FIG. 28 illustrates how ball chains 860 are used to adjust the pitch of the distal ends of opposing blades 160. Note that gear/pulley 1000 is driven by a hydraulic motor (not shown). The rest of the gear/pulleys are idlers. The opposite side is a mirror image of the side shown, including a hydraulic drive motor synchronized to the hydraulic motor driving gear/pulley 1000. It will be understood that a second pair of drivers similar to that shown will be employed to adjust the distal ends of a pair of blades 160 orthogonal to those shown.

Figure 29:
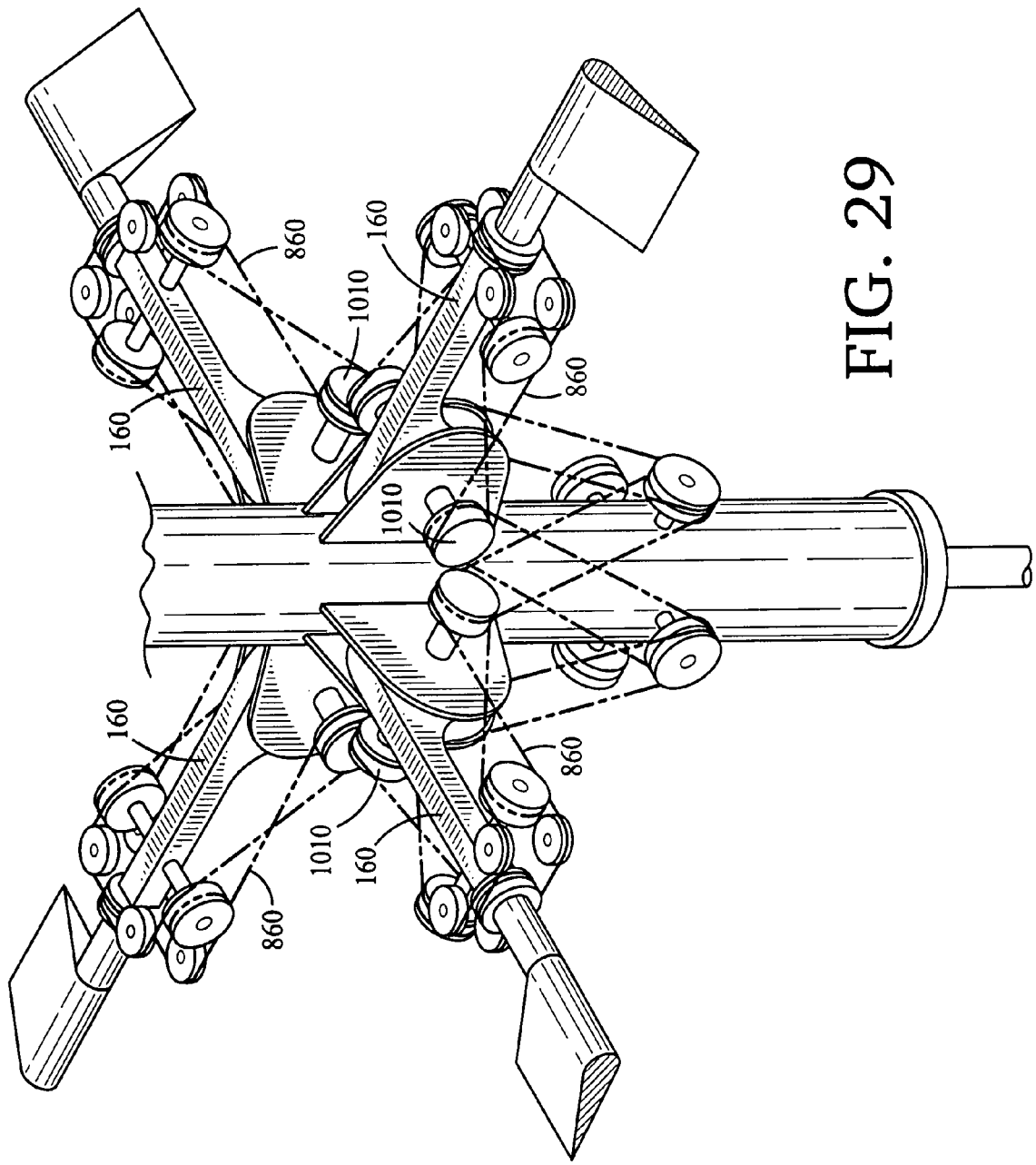
FIG. 29 is a fragmentary isometric view showing the routing of the ball chains to adjust the pitch of the distal ends of the blades using the ball chains.

FIG. 29 illustrates the routing of ball chains 860 to adjust the pitches of the distal ends of blades 160 using the ball chains. Note that there are four motorized gear pulleys 1010 (only three visible on FIG. 29) that drive the ball chains 860. The rest of the gear/pulleys are idlers. For greater clarity, the teeth on the gear/pulleys have been omitted.

Figure 30:
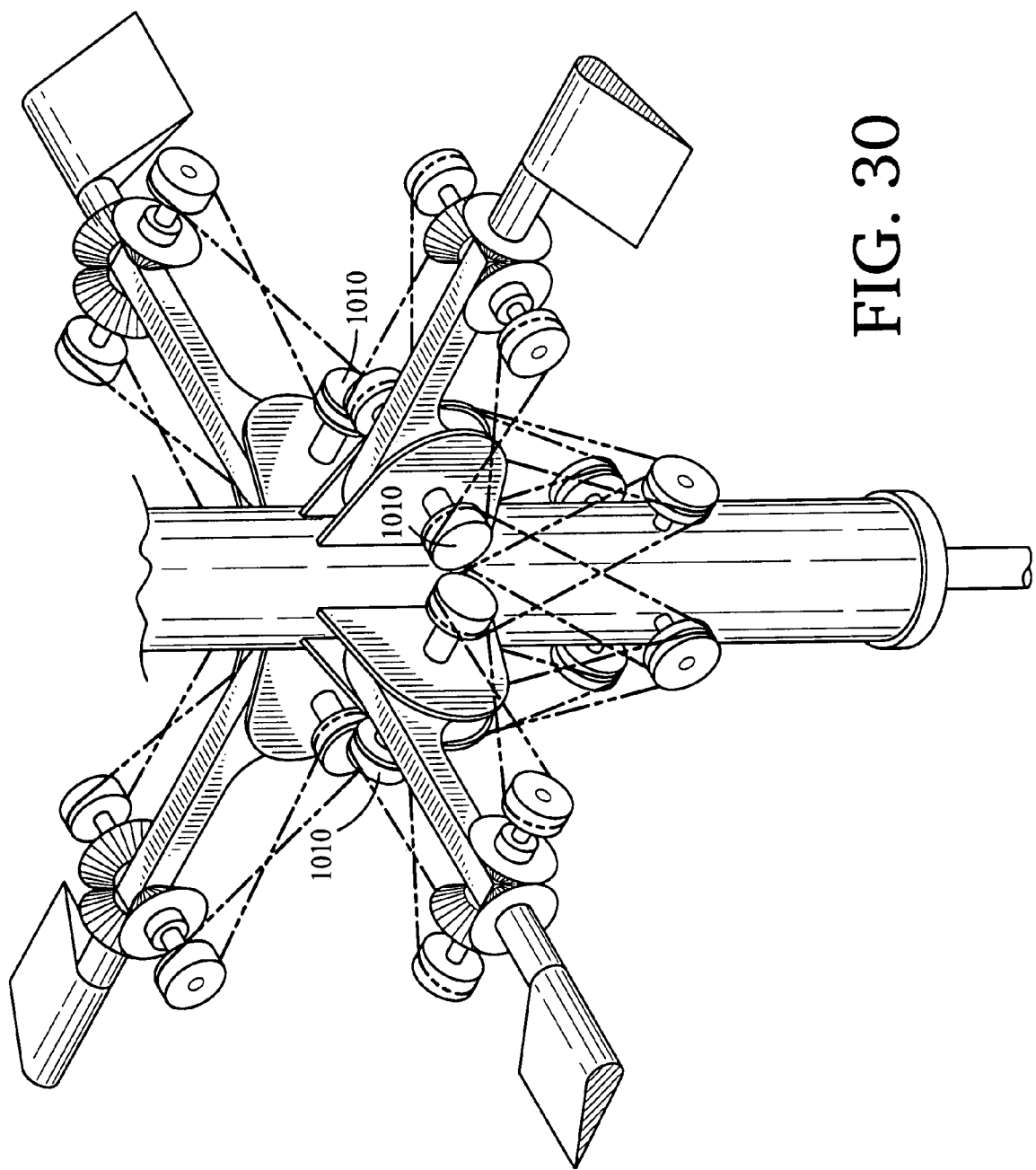
FIG. 30 is a fragmentary isometric view showing the routing of the ball chains to adjust the pitch of the distal ends of the blades using miter gears.

FIG. 30 illustrates the routing of ball chains 860 to adjust the pitch of the distal ends of blades 160 using miter gears. Again, there are only four motorized gear/pulleys that drive ball chains 860, the rest of the gear/pulleys being idlers. Again, for greater clarity, the teeth on the gear/pulleys have been omitted.

Figure 31:
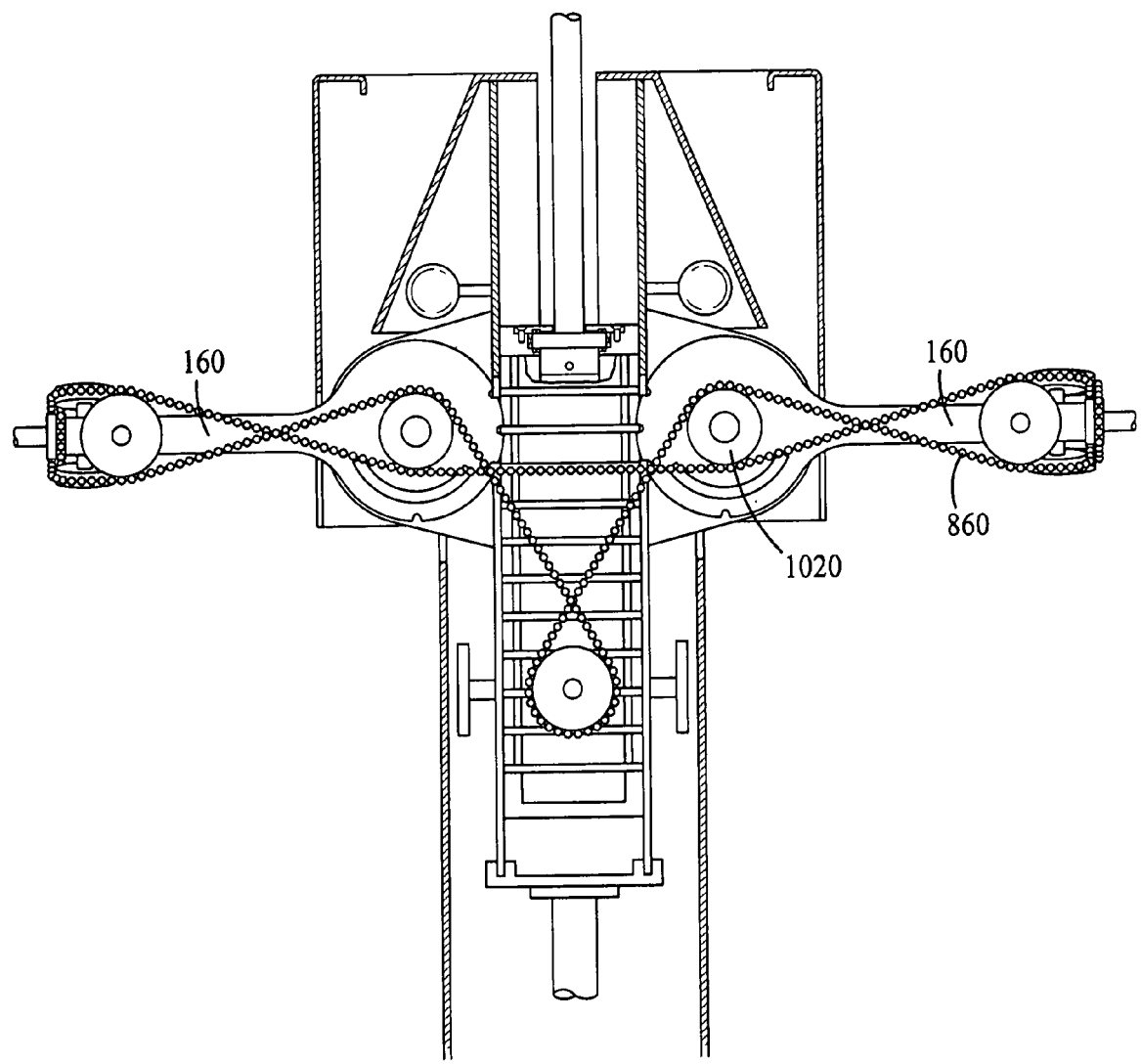
FIG. 31 is a fragmentary side elevational view of an alternative embodiment of the routing of a chain 860.

FIG. 31 illustrates an alternative embodiment of the routing of ball chain 860. Again, only gear/pulley 1020 is motorized.

Figure 32:
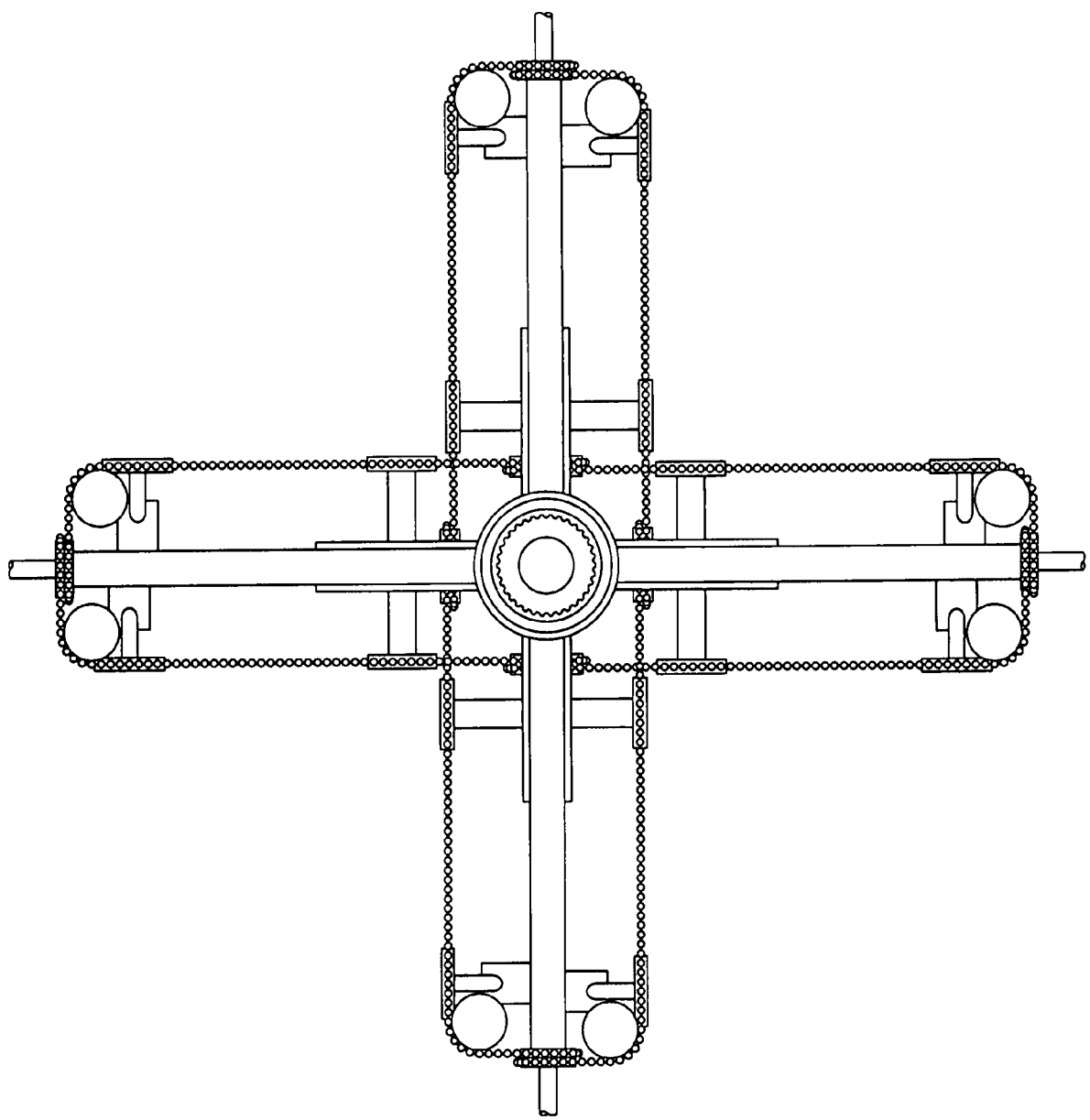
FIG. 32 is a fragmentary top plan view of the embodiment of FIG. 31.

FIG. 32 is another view of the alternative embodiment of FIG. 31.

It should be noted that the embodiment of FIGS. 22-30 has four ball chains 860 per side for a total of sixteen chains, while the embodiment of FIGS. 31 and 32 has only one ball chain per side for a total of four chains.

In the embodiments of the present invention described above, it will be recognized that individual elements and/or features thereof are not necessarily limited to a particular embodiment but, where applicable, are interchangeable and can be used in any selected embodiment even though such may not be specifically shown.

Spatially orienting terms such as "above", "below", "upper", "lower", "inner", "outer", "inwardly", "outwardly", "vertical", "horizontal", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

The embodiments of the invention in which an exclusive property or privilege is claimed are defined as follows:

1. In an aircraft of the type having an aircraft body connected with an engine, a control apparatus connected to the body, said control apparatus comprising in combination:
   a) a column connected to said body and being displaced laterally therefrom,
   b) said column carrying a turnably driven rotor, said rotor carrying a plurality of turnable rotor blades,
   c) said rotor blades being extendable radially of the column, or alternately nestable radially into the column when said rotor is not turning,
   d) turning of said rotor blades applying to the column and to the aircraft body, a lifting force on that side of the aircraft body facing the rotor blades, to selectively tilt and stabilize the aircraft according to the speed of the rotor blades.

2. A control apparatus as claimed in claim 1, wherein said rotor blades are extended or nested by means of a driven member disposed in said column.

3. A control apparatus as claimed in claim 2, wherein said driven member has rings that engage indentations on the inner ends of the rotor blades.

4. A control apparatus as claimed in claim 2, wherein said driven member is operated by a hydraulic cylinder.

5. A control apparatus as claimed in claim 1, and further including additional rotor blades, and wherein the pitch of each rotor blade is adjustable by means of endless belts.

6. A control apparatus as claimed in claim 5, wherein said endless belts comprise ball chains.

7. A control apparatus as claimed in claim 6, wherein the pitches of two rotor blades are adjusted by means of two ball chains, each ball chain being driven by a hydraulic cylinder.

8. A control apparatus as claimed in claim 6, wherein said pitches are adjustable by said ball chains.

9. A control apparatus as claimed in claim 5, wherein said pitches are adjustable by miter gears driven by said ball chains.

10. In an aircraft of the type having an aircraft body connected with an engine, a control apparatus connected to the body, said control apparatus comprising in combination:
    a) a pair of columns connected to said body and being displaced laterally therefrom and from each other,
    b) said columns each carrying a turnably driven rotor, each of said rotors carrying a plurality of turnable rotor blades,
    c) the rotor blades of each of said columns being extendable radially of the respective column, or alternately nestable radially into the respective column when the rotor of the respective column is not turning,
    d) turning of the rotor blades of each column applying to its column and to the aircraft body, a lifting force to selectively tilt and stabilize the aircraft according to the speeds of the rotor blades.

* * * * *